US008736858B2

(12) United States Patent
Mori

(10) Patent No.: US 8,736,858 B2
(45) Date of Patent: May 27, 2014

(54) IMAGE PROCESSING APPARATUS, IMAGE PROCESSING METHOD AND RECORDING MEDIUM

(75) Inventor: Kosuke Mori, Nagoya (JP)

(73) Assignee: Brother Kogyo Kabushiki Kaisha, Nagoya-Shi, Aichi-Ken (JP)

( * ) Notice: Subject to any disclaimer, the term of this patent is extended or adjusted under 35 U.S.C. 154(b) by 128 days.

(21) Appl. No.: 13/329,908

(22) Filed: Dec. 19, 2011

(65) Prior Publication Data

US 2012/0162680 A1    Jun. 28, 2012

(30) Foreign Application Priority Data

Dec. 28, 2010 (JP) .................................. 2010-293577

(51) Int. Cl.
*G06K 15/00* (2006.01)

(52) U.S. Cl.
USPC ....................................................... 358/1.13

(58) Field of Classification Search
USPC ................ 358/2.1, 500, 515, 530, 1.13–1.16; 382/166, 162, 170, 232, 251, 253, 266, 382/272
See application file for complete search history.

(56) References Cited

U.S. PATENT DOCUMENTS

| | | | | |
|---|---|---|---|---|
| 5,838,455 | A * | 11/1998 | Imaizumi et al. | 358/3.1 |
| 6,151,405 | A * | 11/2000 | Douglass et al. | 382/133 |
| 6,471,347 | B1 * | 10/2002 | Koitabashi et al. | 347/98 |
| 6,539,110 | B2 * | 3/2003 | Myers | 382/162 |
| 6,961,462 | B2 * | 11/2005 | Watanabe et al. | 382/164 |
| 7,012,713 | B1 * | 3/2006 | Hiruma | 358/1.9 |
| 7,295,702 | B2 * | 11/2007 | Vrhel | 382/165 |
| 7,463,388 | B2 * | 12/2008 | Tomiyasu et al. | 358/3.24 |
| 7,864,193 | B2 * | 1/2011 | Olive | 345/600 |
| 8,040,413 | B2 * | 10/2011 | Egawa et al. | 348/278 |
| 2005/0219379 | A1 * | 10/2005 | Shi | 348/223.1 |
| 2006/0222240 | A1 * | 10/2006 | Hirota et al. | 382/162 |
| 2007/0223021 | A1 * | 9/2007 | Song | 358/1.9 |
| 2008/0187214 | A1 | 8/2008 | Shoda | |
| 2009/0079777 | A1 * | 3/2009 | Nagamura et al. | 347/15 |

(Continued)

FOREIGN PATENT DOCUMENTS

| | | |
|---|---|---|
| JP | 2003-116011 | 4/2003 |
| JP | 2007-251740 | 9/2007 |
| JP | 2008-193680 | 8/2008 |

OTHER PUBLICATIONS

U.S. Appl. No. 13/240,633, to Mori, dated Sep. 22, 2011.

*Primary Examiner* — Vu B Hang
*Assistant Examiner* — Kevin Ky
(74) *Attorney, Agent, or Firm* — Scully, Scott, Murphy & Presser, P.C.

(57) ABSTRACT

An image processing apparatus that selects an image output mode from one of a plurality of output modes, the image processing apparatus including: an output mode selection unit that selects the image output mode by sequentially determining whether or not to select an image output mode in accordance with an output mode order allotted to the plurality of output modes, based on a ratio of a classified number of blocks to a reference number of blocks, wherein in a first determination in the output mode order, the reference number of blocks is a total number of blocks of the image, and in a second or subsequent determination in the output mode order, the reference number of blocks is a value that is obtained by subtracting the classified number of blocks in a preceding determination in the output mode order from the reference number of blocks in the preceding determination.

6 Claims, 14 Drawing Sheets

(56) References Cited

U.S. PATENT DOCUMENTS

| | | | |
|---|---|---|---|
| 2010/0046831 A1* | 2/2010 | Kang | 382/166 |
| 2010/0088201 A1* | 4/2010 | Nagarajan et al. | 705/29 |
| 2010/0272356 A1* | 10/2010 | Hong | 382/170 |
| 2010/0316127 A1* | 12/2010 | Yokoyama | 375/240.16 |
| 2011/0013241 A1* | 1/2011 | Ohara | 358/518 |
| 2011/0019920 A1* | 1/2011 | Hu | 382/195 |
| 2011/0026849 A1* | 2/2011 | Kameyama | 382/260 |
| 2011/0052051 A1* | 3/2011 | Takeshita | 382/165 |
| 2011/0096985 A1* | 4/2011 | Matsuhira | 382/166 |

\* cited by examiner

| PIXEL | NUMBER OF PIXELS | RATIO |
|---|---|---|
| WHITE | 96,940 | 96.94% |
| COLOR | 1,000 | 1.00% |
| GRAY | 60 | 0.06% |
| BLACK | 2,000 | 2.00% |
| TOTAL SUM | 100,000 | 100% |

| PIXEL | NUMBER OF PIXELS | RATIO |
|---|---|---|
| WHITE | 60,000 | 60.00% |
| COLOR | 1,000 | 1.00% |
| GRAY | 1,000 | 1.00% |
| BLACK | 38,000 | 38.00% |
| TOTAL SUM | 100,000 | 100% |

| PAGE | THRESHOLD VALUE |
|---|---|
| WHITE | ≧99% |
| COLOR | ≧1% |
| GRAY | ≧5% |
| MONOCHROME | (THE OTHERS) |

| PIXEL | NUMBER OF PIXELS IN A BLOCK | RATIO IN A BLOCK |
|---|---|---|
| WHITE | 1500 | 81% |
| COLOR | 351 | 19% |
| GRAY | 0 | 0% |
| BLACK | 0 | 0% |
| TOTAL SUM | 1851 | 100% |

| PIXEL | NUMBER OF PIXELS IN A BLOCK | RATIO IN A BLOCK |
|---|---|---|
| WHITE | 1500 | 81% |
| COLOR | 19 | 1% |
| GRAY | 20 | 1% |
| BLACK | 310 | 17% |
| TOTAL SUM | 1851 | 100% |

| BLOCK | THRESHOLD VALUE |
|---|---|
| WHITE | ≧99% |
| COLOR | ≧3% |
| GRAY | ≧5% |
| BLACK | (THE OTHERS) |

FIG. 5A

|   | 1 | 2 | 3 | 4 | 5 | 6 |
|---|---|---|---|---|---|---|
| 1 | あ |   |   |   |   |   |
| 2 | あ |   |   |   |   |   |
| 3 | あ |   |   |   |   |   |
| 4 | あ |   |   |   |   |   |
| 5 | あ |   |   |   |   |   |
| 6 | あ |   |   |   |   |   |

FIG. 5B (6×9 grid filled with あ in every cell)

FIG. 5C

|   | 1 | 2 | 3 | 4 | 5 | 6 |
|---|---|---|---|---|---|---|
| 1 | C | W | W | W | W | W |
| 2 | C | W | W | W | W | W |
| 3 | B | W | W | W | W | W |
| 4 | B | W | W | W | W | W |
| 5 | B | W | W | W | W | W |
| 6 | B | W | W | W | W | W |

| BLOCK | NUMBER OF BLOCKS | RATIO |
|---|---|---|
| WHITE | 48 | 88.89% |
| COLOR | 2 | 3.70% |
| GRAY | 0 | 0.00% |
| BLACK | 4 | 7.41% |
| TOTAL SUM | 54 | 100% |

FIG. 5D (grid filled with B in every cell)

| BLOCK | NUMBER OF BLOCKS | RATIO |
|---|---|---|
| WHITE | 0 | 0.00% |
| COLOR | 0 | 0.00% |
| GRAY | 0 | 0.00% |
| BLACK | 54 | 100.00% |
| TOTAL SUM | 54 | 100% |

FIG. 5E

| PAGE | THRESHOLD VALUE |
|---|---|
| WHITE | ≧99% |
| COLOR | ≧3% |
| GRAY | ≧5% |
| MONOCHROME | (THE OTHERS) |

FIG. 6A
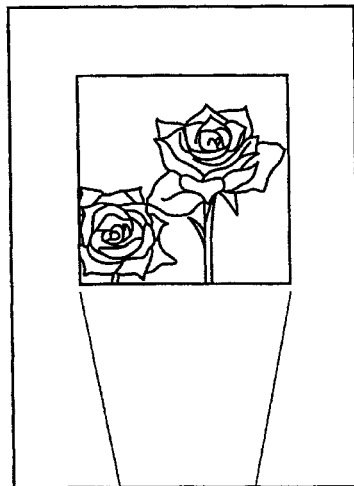
| PIXEL | NUMBER OF PIXELS | RATIO |
|---|---|---|
| WHITE | 70,000 | 70% |
| COLOR | 15,000 | 15% |
| GRAY | 5,000 | 5% |
| BLACK | 10,000 | 10% |
| TOTAL SUM | 100,000 | 100% |
FIG. 6B
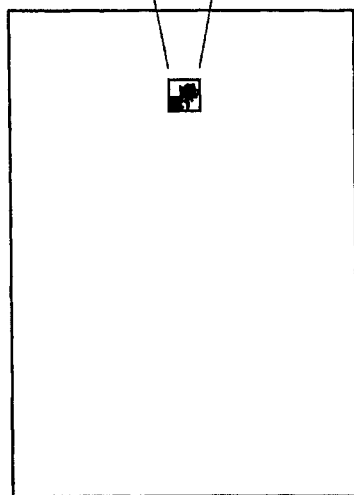
| PIXEL | NUMBER OF PIXELS | RATIO |
|---|---|---|
| WHITE | 97,000 | 97% |
| COLOR | 1,500 | 1.5% |
| GRAY | 500 | 0.5% |
| BLACK | 1,000 | 1% |
| TOTAL SUM | 100,000 | 100% |
FIG. 6C
| PAGE | THRESHOLD VALUE |
|---|---|
| WHITE | $\geqq 98\%$ |
| COLOR | $\geqq 2\%$ |
| GRAY | $\geqq 5\%$ |
| MONOCHROME | (THE OTHERS) |

FIG. 7A

| PIXEL | NUMBER OF PIXELS | RATIO |  |
|---|---|---|---|
| WHITE | 70,000 | 70% | (70,000/100,000) |
| COLOR | 15,000 | 50% | (15,000/30,000) |
| GRAY | 5,000 | 16.7% | (5,000/15,000) |
| BLACK | 10,000 | 33.3% | (10,000/15,000) |

FIG. 7B

| PIXEL | NUMBER OF PIXELS | RATIO |  |
|---|---|---|---|
| WHITE | 97,000 | 97% | (97,000/100,000) |
| COLOR | 1,500 | 50% | (1,500/3,000) |
| GRAY | 500 | 16.7% | (500/1,500) |
| BLACK | 1,000 | 33.3% | (1,000/1,500) |

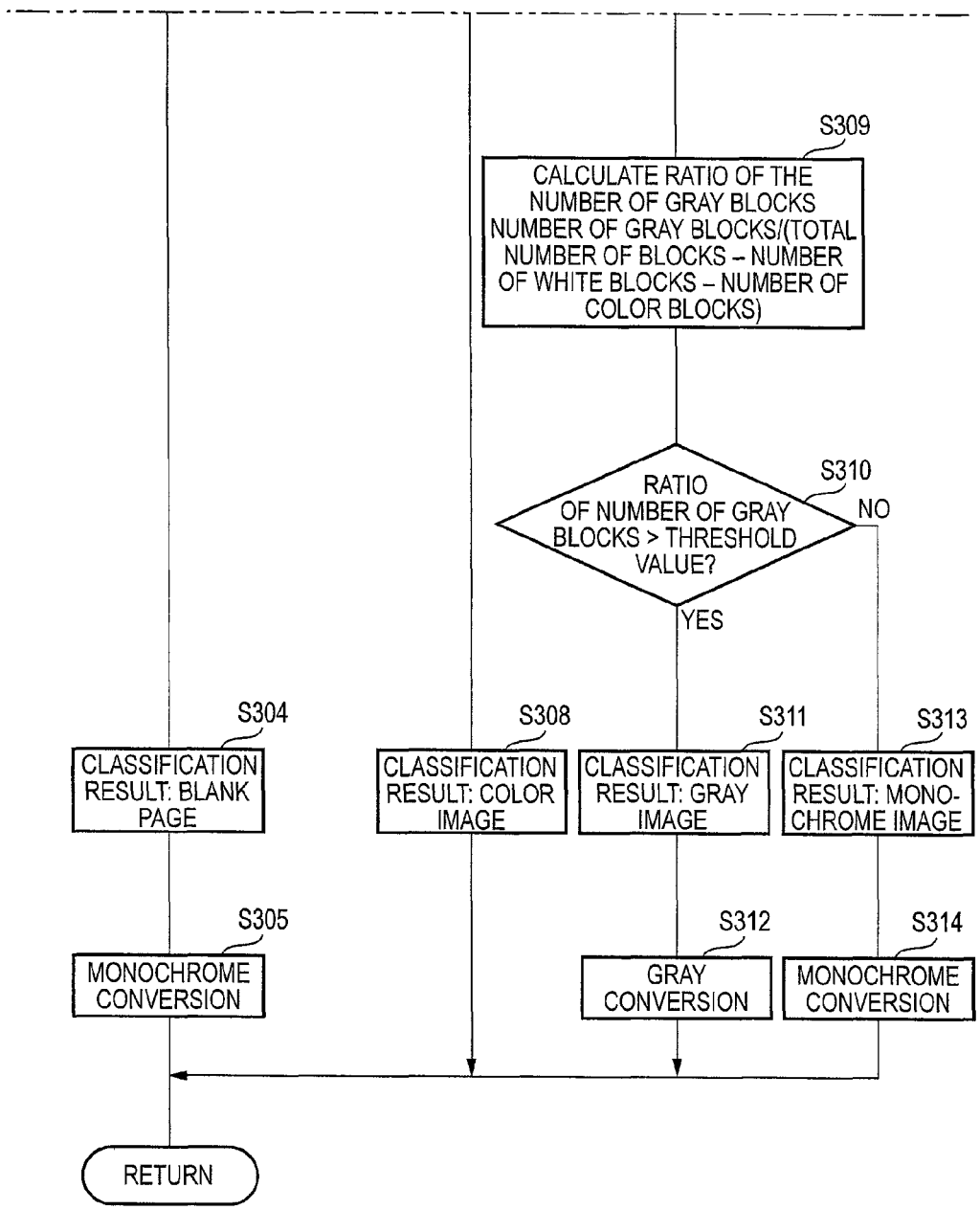

IMAGE PROCESSING APPARATUS, IMAGE PROCESSING METHOD AND RECORDING MEDIUM

CROSS-REFERENCE TO RELATED APPLICATIONS

This application claims priority from Japanese Patent Application No. 2010-293577 filed on Dec. 28, 2010, the entire contents of which are incorporated herein by reference.

TECHNICAL FIELD

Aspects of the invention relate to a technology of classifying an image with respect to color characteristics and selecting an image output mode, based on image data indicating the image, and particularly, to a technology of preventing a misclassification of an image.

BACKGROUND

In fields of printers and displays, an image, i.e., text, photograph, graphic and the like, is output by printing the image on a printing medium or by displaying the image on a display. An image that is an output target, hereinafter, referred to as "target image", has various color characteristics. The target image may be a monochrome image or a color image.

Adding a remark to the definition of the term "image" throughout the specification, when a document of one page is divided into an object part, i.e., text, photograph, graphic and the like, and a background part, i.e., background color part, the term "image" should not be interpreted to mean a term indicating only the object part and should be interpreted to mean a term indicating the whole document including the background part. According to this definition, the term "image of one page" means "an image that is displayed on the whole document of one page."

In the fields of printers and displays, when a target image i.e., document, is actually a monochrome image, it is ideal to output the target image in a monochrome output mode after distinguishing the target image as a monochrome image. Likewise, when a target image is actually a color image, it is ideal to output the target image in a color output mode after distinguishing the target image as a color image.

Accordingly, in the field of image outputting, based on image data indicating an image of one page, an image output mode for outputting the image has been selected page by page as one of a plurality of output modes including a monochrome output mode and a color output mode.

According to a technology disclosed in related-art, based on image data indicating a target image, color pixels are extracted from a plurality of pixels configuring the target image and are counted. When a number of counts exceed a threshold value, the target image is distinguished as a color image. Also, the target image of one page is divided into a plurality of blocks, blocks including color pixels are extracted from the plurality of blocks and a number of the color pixels in the extracted blocks are counted as the number of color pixels.

According to a technology disclosed in another related-art, the image data, which is obtained by reading a document, is divided into a plurality of blocks and it is determined whether each block is a color block or a monochrome block. The number of the color blocks is counted. When the number of counts exceeds a threshold value, it is determined that the image of the document is a color image. On the other hand, when the number of counts is the threshold value or smaller, it is determined that the image of the document is a monochrome image.

The inventors of the invention performed various researches regarding the image processing method of selecting, based on image data indicating an image, an image output mode for outputting the image from one of a plurality of output modes including a monochrome output mode and a color output mode. As a result, the inventors found the following findings, which will be specifically described later.

When a color part exists in a document to be read, it is natural that a reading result of the document includes the color pixels. However, even though a document to be read does not include a color part, the reading result of the document may include the color pixels due to a color shift, which will be specifically described later, at the time of reading an image.

When the color shift occurs, the document may be misclassified into a color image and thus a color output mode may be erroneously selected, even though the document should be normally classified into a monochrome image and a monochrome output mode should be selected. When performing the image processing, it is important to prevent the misclassification of the target image and the erroneous selection of the image output mode due to the misclassification.

Hereinafter, a situation where a document is classified into a color image when a ratio of the number of color pixels of a plurality of pixels configuring a target image, i.e., a document of one page, to a number of total pixels configuring the document is larger than a threshold value is considered.

In this case, the classification result of the document depends on a ratio of the number of color pixels, which is a ratio of the number of color pixels to the total number of pixels. In the meantime, regarding a case where a color object, i.e., text, photograph, graphic and the like, exists on a document, when a first color object is displayed on a first document in a large size, the ratio of the number of color pixels is large. However, regarding a case where a second color object is displayed on a second document in a small size, for example, where the second color object, which is the first color object being reduced, is displayed on the second document having the same size as the first document, the ratio of the number of color pixels is small.

Since the two documents both have the color objects, the two documents should be classified into a color image. However, in some cases, when the color object is displayed in a large size on the document, the document is classified into a color image, but when the color object is displayed in a small size on the document, the document may be erroneously classified into an image other than a color image, for example a monochrome image, due to a reduction in the ratio of the number of color pixels. Accordingly, an output mode other than the color output mode may be erroneously selected. Therefore, when performing the image processing, it is also important to prevent the misclassification of the target image and the erroneous selection of the image output mode due to the misclassification.

Based on the above-described findings, aspects of the invention provide a technology of classifying an image with respect to color characteristics thereof, based on image data indicating the image, and selecting an image output mode, and an object of the invention is to easily prevent a misclassification of color characteristics of an image.

SUMMARY

The invention provides following aspects, respectively. Each aspect is distinguished by a paragraph and each paragraph is accompanied by a number. Each paragraph is described in a format of depending on the number of the other paragraph, as required. However, by describing each paragraph in a format of depending on the number of the other paragraph, it is possible to enable the technical features described in the respective paragraphs to be appropriately independent each other.

According to an aspect of the invention, there is provided an image processing apparatus that selects, based on data of an image that is acquired, an image output mode for outputting the image from one of a plurality of output modes. The image processing apparatus includes a pixel classification unit, an image division unit, a block classification unit and an output mode selection unit. The pixel classification unit classifies each pixel of the image into one of a plurality of pixel categories based on the image data of each pixel. The image division unit divides the image into a plurality of blocks, the plurality of blocks each including a plurality of pixels adjacent to each other. The block classification unit classifies each of the plurality of blocks into one of a plurality of block categories based on the pixel category of each of the plurality of pixels belonging to each of the plurality of blocks. The output mode selection unit selects the image output mode by sequentially determining whether or not to select an image output mode as one of the plurality of output modes in accordance with an output mode order allotted to the plurality of output modes, based on a ratio of a classified number of blocks, which is a number of blocks classified into each block category, to a reference number of blocks. In a first determination in the output mode order by the output mode selection unit, the reference number of blocks is a total number of the plurality of blocks of the image, and in a second or subsequent determination in the output mode order by the output mode selection unit, the reference number of blocks is a value that is obtained by subtracting the classified number of blocks in a preceding determination in the output mode order by the output mode selection unit from the reference number of blocks in the preceding determination in the output mode order by the output mode selection unit.

According to another aspect of the invention, there is provided an image processing method for selecting, based on data of an image that is acquired, an image output mode for outputting the image from one of a plurality of output modes, the image processing method comprising: classifying each pixel of the image into one of a plurality of pixel categories based on the image data of each pixel; dividing the image into a plurality of blocks, the plurality of blocks each including a plurality of pixels adjacent to each other; classifying each of the plurality of blocks into one of a plurality of block categories based on the pixel category of each of the plurality of pixels belonging to each of the plurality of blocks; and selecting the image output mode by sequentially determining whether or not to select an image output mode as one of the plurality of output modes in accordance with an output mode order allotted to the plurality of output modes, based on a ratio of a classified number of blocks, which is a number of blocks classified into each block category, to a reference number of blocks, wherein in a first determination in the output mode order, the reference number of blocks is a total number of the plurality of blocks of the image, and in a second or subsequent determination in the output mode order, the reference number of blocks is a value that is obtained by subtracting the classified number of blocks in a preceding determination in the output mode order from the reference number of blocks in the preceding determination in the output mode order.

According to another aspect of the invention, there is provided a computer readable recording medium storing a computer program for causing a computer to perform an image processing method of selecting, based on data of an image that is acquired, an image output mode for outputting the image from one of a plurality of output modes, the image processing method comprising: classifying each pixel of the image into one of a plurality of pixel categories based on the image data of each pixel; dividing the image into a plurality of blocks, the plurality of blocks each including a plurality of pixels adjacent to each other; classifying each of the plurality of blocks into one of a plurality of block categories based on the pixel category of each of the plurality of pixels belonging to each of the plurality of blocks; and selecting the image output mode by sequentially determining whether or not to select an image output mode as one of the plurality of output modes in accordance with an output mode order allotted to the plurality of output modes, based on a ratio of a classified number of blocks, which is a number of blocks classified into each block category, to a reference number of blocks, wherein in a first determination in the output mode order, the reference number of blocks is a total number of the plurality of blocks of the image, and in a second or subsequent determination in the output mode order, the reference number of blocks is a value that is obtained by subtracting the classified number of blocks in a preceding determination in the output mode order from the reference number of blocks in the preceding determination in the output mode order.

BRIEF DESCRIPTION OF DRAWINGS

FIG. 5 (5A, 5B, 5C, 5D, 5E) is another view illustrating the function effects of the image processing method;

FIG. 6 (6A, 6B, 6C) is a view illustrating another point to be improved in an image processing method that was suggested by the inventors before the invention;

FIG. 7 (7A, 7B) is a view illustrating function effects of the image processing method that is executed by the image reading apparatus shown in FIG. 1;

DETAILED DESCRIPTION

Hereinafter, an image reading apparatus 10 according to a specific and exemplary embodiment of the invention will be described in detail with reference to the drawings.

Figure 1:
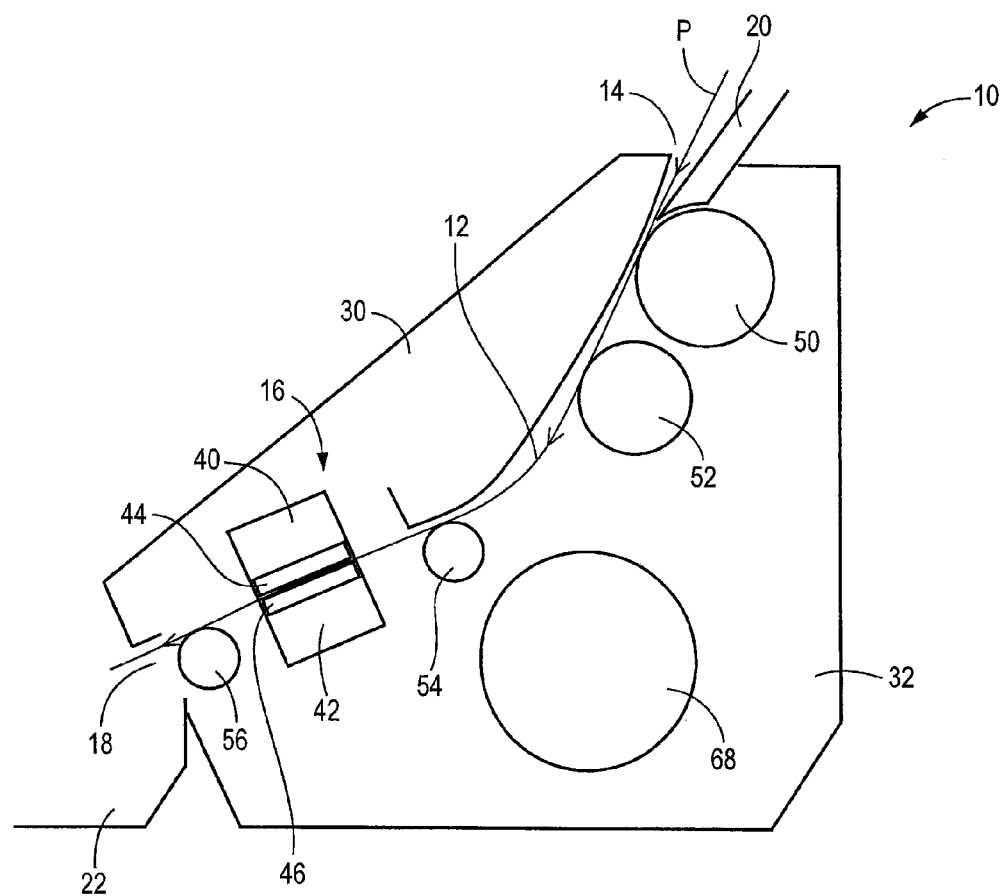
FIG. 1 is a side sectional view showing an image reading apparatus according to an illustrative embodiment of the invention.

FIG. 1 is a sectional view showing a hardware configuration of the image reading apparatus 10. The image reading apparatus 10 scans and reads at least one of an image displayed on an upper surface of a document having an image, for example, text, photograph and graphic, to be read, i.e., a sheet P, and an image displayed on a lower surface of the sheet P, in a main scanning direction, i.e., a direction perpendicular to the sheet surface in FIG. 1, while conveying the sheet P in a sub-scanning direction, i.e., a direction parallel to the sheet surface in FIG. 1. Thereby, the image reading apparatus 10 reads the image two-dimensionally and thus generates image data.

The image reading apparatus 10 may be incorporated into or externally mounted to a printer not shown, which prints an image based on the image data generated as described above, or a multifunctional machine not shown having a part functioning as a printer.

The image reading apparatus 10 also has an output mode function of automatically selecting a mode for outputting an image the on a printing medium of a printer not shown or a screen of a display not shown, based on the image data, without user intervention. The mode for outputting the image can be selected from a plurality of output modes including a monochrome output mode and a color output mode.

Throughout the description, the term "monochrome output mode" should be interpreted to include at least the latter of a mode of outputting an image such that the total image has a background color, i.e., the total image does not include a colored pixel at all, irrespective of chromatic color and achromatic color, and a mode of outputting an image so as to include a black pixel. Further, the term "monochrome pixel" should be interpreted to include at least the latter of a white pixel, i.e., a pixel having a background color, and a black pixel. In addition, the term "monochrome block" should be interpreted to include at least the latter of a white block, i.e., a block having a background color on the whole, and a black block having black pixels.

The output mode function is equivalent to a function of classifying or distinguishing an image (hereinafter, referred to as "target image"), which is indicated by the image data, into one of a plurality of image categories including a monochrome image and a color image with respect to types of colors and the number of colors (color characteristics) used for the image.

According to the output mode selection function, i.e., image category distinguishing function, the following cases can be prevented. First, a case where a processing for outputting a color image, for example, consumption of color toners, is uselessly performed to the image though the read image is actually a monochrome image can be prevented. Second, a case where an image is output as a monochrome image though the read image is actually a color image, and thus, the original image is not be correctly reproduced, can be prevented.

As shown in FIG. 1, the image reading apparatus 10 has a sheet feeding opening 14, an image reading unit 16 that optically reads an image on the sheet P and a sheet discharge opening 18 from an upstream side, i.e., right side in FIG. 1, of a conveyance path 12 of the sheet P toward a downstream side, i.e., left side in FIG. 1. The sheet feeding opening 14 is mounted with a sheet feeding tray 20 that can stack and accommodate therein a plurality of sheets P on standby before they are fed to the sheet feeding opening 14. In the meantime, the sheet discharge opening 18 is mounted with a sheet discharge tray 22 that can stack and accommodate therein the sheets P discharged from the sheet discharge opening 18.

Figure 2:
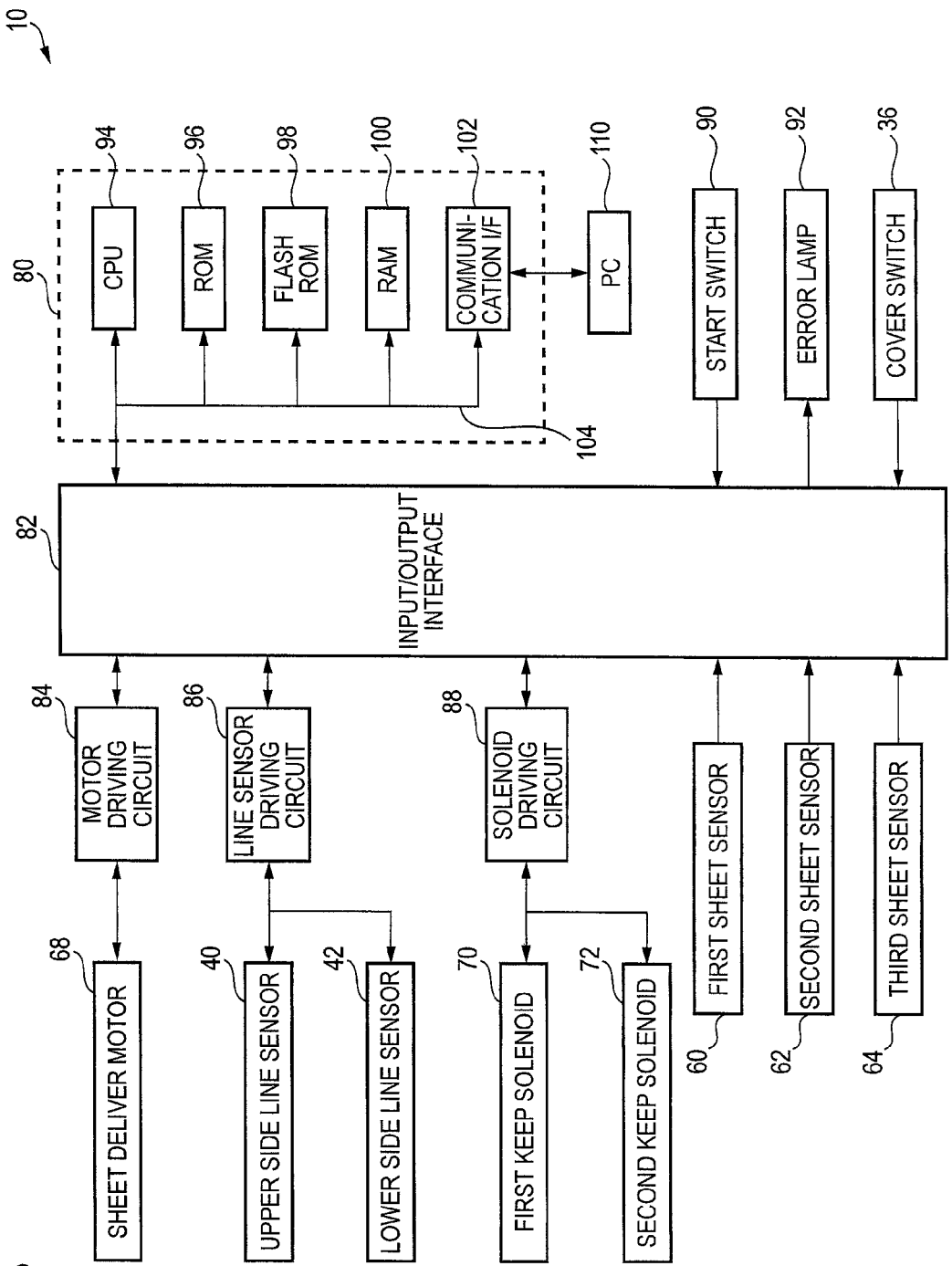
FIG. 2 is a block diagram showing a configuration of an electronic circuit of the image reading apparatus shown in FIG. 1.

The image reading apparatus 10 further has an upper side frame 30 and a lower side frame 32, which are spaced with the conveyance path 12 being interposed therebetween. The upper side frame 30 and the lower side frame 32 are connected to each other so that they can be switched between a using position, shown, and a deployed position, not shown, by rotation about one axis line, i.e., an axis line, not shown, extending in a direction perpendicular to the sheet surface of FIG. 1. A cover switch 36, as shown in FIG. 2, is provided so as to detect whether the upper side frame 30 is located at the closest position to the lower side frame 32 or at the most distant position from the lower side frame.

The image reading apparatus 10 is provided at its image reading unit 16 with an upper side line sensor 40 and a lower side line sensor 42. The upper side line sensor 40 is a sensor that is mounted to the upper side frame 30 and optically reads an image on an upper surface, i.e., front side, of the sheet P located at a predetermined image reading position. Compared to this, the lower side line sensor 42 is a sensor that is mounted to the lower side frame 32 and optically reads an image on a lower surface, i.e., back side, of the sheet P located at the image reading position.

The upper side line sensor 40 and the lower side line sensor 42 have, respectively, an optic unit , which includes, for example, a light source, a lens and a light receiving device, for example, Charge-Coupled Device, and are closely contacted to the sheet P with contact glasses 44, 46 thereof being interposed therebetween.

In the respective line sensors 40, 42, the light sources emit lights, the emitted lights pass through the corresponding contact glasses 44, 46 and illuminate the sheet P and the reflected lights from the sheet P are collected by the lenses and then enter to the light receiving devices. The light receiving device spectrally divides the light entered to the light receiving device into red component light (R), green component light (G) and blue component light (B) and converts the same into a red signal (R), a green signal (G) and a blue signal (B). The three color signals are collectively referred to as RGB signals.

The three color signals are converted into pixel data that indicates an R value, i.e., a red brightness value, a G value, i.e., a green brightness value and a B value i.e., a blue brightness value, for each pixel. The pixel data is binary digital data having 8 bits for each of RGB values. The respective RGB values indicate the brightness values of 256 levels from 0 to 255. The RGB value (0, 0, 0) indicates black and the RGB value (255, 255, 255) indicates white.

As shown in FIG. 1, the image reading apparatus 10 has, as at least one conveyance means, a first conveyance roller 50, a second conveyance roller 52, a third conveyance roller 54 and a sheet discharge roller 56 side by side in the sub-scanning direction so as to convey the sheet P along the conveyance path 12. A first sheet sensor 60, a second sheet sensor 62 and a third sheet sensor 64 shown in FIG. 2, which detect whether or not the sheet P exists, is provided adjacent to the first, second and third conveyance rollers 50, 52, 54, respectively.

In order to respectively rotate the first, second and third conveyance rollers 50, 52, 54 and the sheet discharge roller 56, the image reading apparatus 10 has a sheet delivery motor 68 common to the first, second and third conveyance rollers 50, 52, 54 and the sheet discharge roller 56. In order to switch the first conveyance roller 50 between a rotating state and a stationary state, a first keep solenoid 70 shown in FIG. 2 is provided. In order to switch the second conveyance roller S2 between a rotating state and a stationary state, a second keep solenoid 72 shown in FIG. 2 is provided.

FIG. 2 is a block diagram showing a configuration of an electronic circuit of the image reading apparatus 10. The image reading apparatus 10 has a control circuit unit 80 that controls the whole image reading apparatus, an input/output interface 82 that is electrically connected to the control circuit unit 80, a motor driving circuit 84 that is electrically connected to the input/output interface 82, a line sensor driving circuit 86 and a solenoid driving circuit 88.

The motor driving circuit 84 is electrically connected with the sheet delivery motor 68, the line sensor driving circuit 86 is electrically connected with the upper side and lower side line sensors 40, 42 and the solenoid driving circuit 88 is electrically connected with the first and second keep solenoids 70, 72.

The input/output interface 82 is also electrically connected with a start switch 90 that is operated to start or stop the image reading apparatus 10, an error lamp 92 that is turned on so as to warn abnormality of the image reading apparatus 10, the first, second and third sheet sensors 60, 62, 64 and the cover switch 36, respectively.

The control circuit unit 80 is configured mainly by a computer. Specifically, a Central Processing Unit (CPU) 94 as a processor, a Read Only Memory (ROM) 96, a flash ROM 98 and a Random Access Memory RAM 100 as memories and a communication interface (I/F) 102 are connected to each other by a bus 104, thereby configuring the control circuit unit is 80. The communication I/F 102 is connected with a Personal Computer (PC) as an external apparatus 110 in a wired or wireless manner.

The ROM 96 is a recording medium for storing in advance a control parameter that is necessary for controlling the image reading apparatus 10, a program, not shown, that is executed by the CPU 94 for conveyance control of the sheet P, and the like. The ROM 96 also stores in advance a plurality of threshold values, a plurality of counters and a plurality of reference values, which will be described later. The plurality of reference values includes the reference number of pixels and the reference number of blocks.

The RAM 100 is a recording medium for temporarily storing image data indicating an image on the upper surface of the sheet P, which is read by the upper side line sensor 40, image data indicating an image on the lower surface of the sheet P, which is read by the lower side line sensor 42, and the like. The image data is temporarily stored in the RAM 100 in a page unit.

Figure 8:
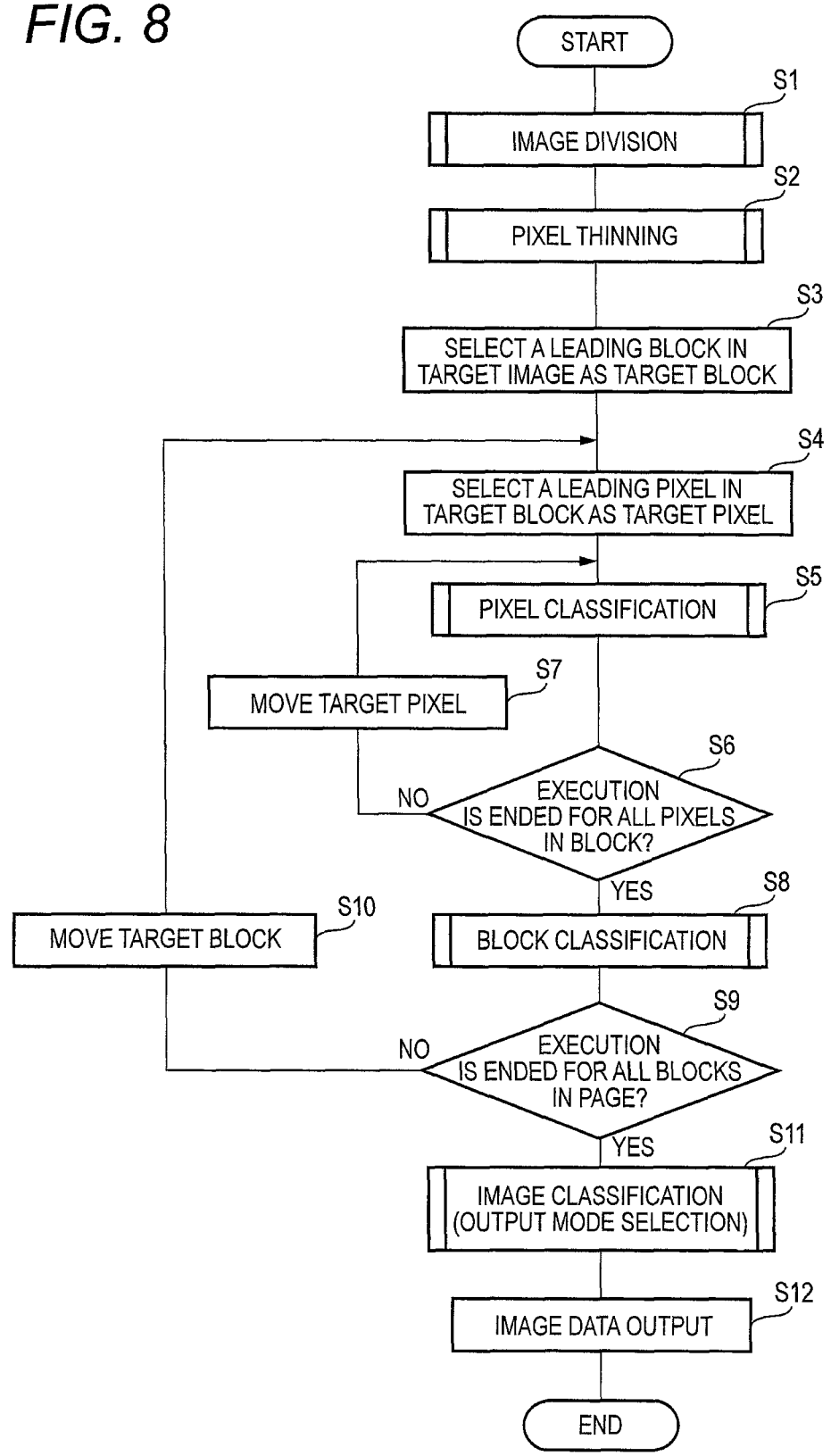
FIG. 8 is a flowchart conceptually showing an image processing program that is executed by a computer of a control circuit unit shown in FIG. 2.

Referring to FIG. 8, the flash ROM 98 stores an image processing program that is executed by the CPU 94 so as to select the image output mode as one of the plurality of output modes for each page of the sheets P.

In this illustrative embodiment, a part of the control circuit unit 80, which executes the image processing program, configures an example of the "image processing apparatus" of the invention. However, as another example, the "image processing apparatus" of the invention can be incorporated into a printer or a multifunctional machine.

The control circuit unit 80 executes the image processing program, thereby implementing an image processing method that will be described below. The image processing method is an example of the "image processing method" of the invention and the flash ROM 98 that stores an image processing program therein is an example of the "recording medium" of the invention.

In the meantime, the inventor of the invention suggested the following image processing method prior to the invention. It is a method of selecting, based on image data that is a set of a plurality of pixel data each indicating colors of a plurality of pixels of an image of one page, an image output mode of outputting the image, which is hereinafter referred to as "target image", in one of a plurality of output modes. The plurality of output modes includes a monochrome output mode and a color output mode. The image processing method is performed for each page.

The above suggested image processing method which is hereinafter referred to as "suggested method", includes a pixel classification process and an output mode selection process. In the pixel classification process, the pixels configuring the target image are respectively classified into one of a plurality of pixel categories including monochrome and color pixels, based on the corresponding pixel data. In the output mode selection process, based on the respective pixel categories of the pixels configuring the target image, the image output mode of the target image is selected as one of the plurality of output modes in accordance with an output mode order that is an order allotted to the output modes in advance.

Here, the configuration of "selecting one output mode for the target image" is equivalent to a configuration of distinguishing, i.e., classifying the target image as one of a plurality of image categories including a monochrome image and a color image.

Specifically, the above output mode selection process is implemented as follows.

In an ith selection, when a ratio RPi of the number of pixels, which is a ratio of the ith classified number of pixels NPi to the reference number of pixels, is larger than a threshold value THPi, an ith output mode of the output mode order is selected as the image output mode. Here, i is an integer of 1 or larger. Here, the ith classified number of pixels NPi is the number of pixels classified into an ith pixel category in the pixel category order among the pixels configuring the target image. According to the suggested method, the reference number of pixels is fixedly set as the total number of pixels included in the target image.

However, the inventors found that the suggested method needs to be improved.

Specifically, according to the suggested method, as described above, the image output mode of the target image is selected based on the ratio of the number of pixels of the target image, which is a ratio of the classified number of pixels for each image category to the total number of pixels. For example, when a ratio of the number of color pixels, which is a ratio of the number of color pixels to the total number of pixels in a target image, is larger than a threshold value, a color output mode is selected for the target image.

Meanwhile, when the target image is actually a color image, the target image naturally includes the color pixels. Accordingly, when a threshold value is set so that the ratio of the number of color pixels exceeds the threshold value, the color output mode is selected for the target image that is actually a color image, as expected.

However, even if the target image is actually a monochrome image, if the target image includes color pixels and the ratio of the number of color pixels exceeds the threshold value, the color output mode may be erroneously selected for the target image that is actually a monochrome image.

For example, in some cases, the colors of the respective pixels of the target image that is actually a monochrome image may be separated into a plurality of color components, for example, R, B and G components, when the target image is being read by a scanner. In this example, if a pixel to be read is a black pixel, the black pixel will be read so that if the plurality of color components of the black pixel is combined, the composed color will be black. However, when a problem of color shift occurs, any one of the color components is intensively read with respect to the black pixel, compared to the other color components. As a result, the pixel that is actually the black pixel is erroneously classified into a color pixel.

Like this, when many pixels are erroneously classified as color pixels and thus the ratio of the number of color pixels resultantly exceeds a threshold value, the color output mode is erroneously selected for the target image that is actually the monochrome image. Hereinafter, such a problem is specifically described with reference to the following specific image examples.

In a first image example shown in FIG. 3A, in a sheet P of one page, which is a document on which an image to be read is displayed, and which is simply also referred to as "document" in the below, a plurality of same letters is arranged in a single horizontal row in a narrow area, i.e., an area corresponding to one row. The first two letters of the letters are red and the other letters are black. Compared to this, in a second image example shown in FIG. 3B, a plurality of same letters, the number of which being more than that of the first image example, is arranged in every direction over substantially the entire area of the document and all the letters are black.

Figures 3A, 3B, 3C:
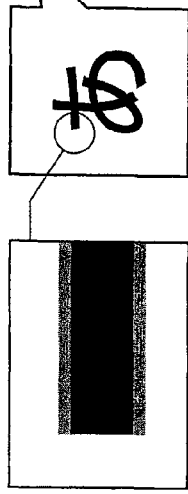
FIG. 3 (3A, 3B, 3C) is a view illustrating a point to be improved in an image processing method that was suggested by the inventors before the invention.

In FIG. 3C, threshold values are shown which are used to classify the target image, i.e., an image on the document, of one page into one of a white image, which is an image having only background color and is a blank page, a color image, a gray image and a monochrome image, which is an image consisting of a background having a background color and black pixels.

In all the image examples, as shown in the leftmost side of FIG. 3B, the above-described color shift occurs when reading a black letter. Accordingly, it is assumed that each black letter, which naturally consists of black pixels only, is read to have not only the black pixels but also color pixels, i.e., in the example of FIG. 3B, the colors that are read for each part of the letter are different between both edges of the part and a central portion of the part and a stripe pattern is formed as a result of the reading. The total number of black letters of the second image example is larger than that of the first image example. Accordingly, in the second image example, the total number of unexpected color pixels, which are pixels that should be originally read as black pixels, caused due to the color shift is larger than that of the first image example.

It is natural that the first image example is classified into the color image and the second image example is classified into the monochrome image. In the first image example, as can be clearly seen from the rightmost reading result of FIG. 3A, the ratio of the number of color pixels is 1.00% satisfies the condition of being equal to or larger than the threshold value 1% shown in FIG. 3C. Accordingly, the first image example is classified into the color image, as expected.

However, in the second image example, as can be clearly seen from the rightmost reading result of FIG. 3B, even though the second image example actually has the black letters only, the ratio of the number of color pixels is 1.00%. Therefore, since the ratio of the number of color pixels of the second image example satisfies a condition of being equal to or larger than the threshold value 1% shown in FIG. 3C, it is unexpectedly classified into the color image.

Like this, according to the suggested method, when the pixels are read as color pixels due to the color shift at the time of reading an image, the target image that should be originally classified into the monochrome image may be erroneously classified into the color image.

In order to prevent the misclassification of the image, the inventors developed an image processing method including the following processes.

1. Image Division Process

In this process, an image, which is hereinafter referred to as "target image", of one page of the sheet P is divided into a plurality of blocks, each of which including a plurality of pixels continuous to each other. Here, the target image is divided into the blocks so that each block has a larger size as a resolution of the corresponding image data is higher.

2. Pixel Classification Process

In this process, the respective pixels are sequentially classified into one of a plurality of pixel categories including white, color, gray and black pixels, based on the corresponding pixel data, in accordance with a pixel category order allotted to the pixel categories in advance. In this illustrative embodiment, the pixel category order is an order of white, color, black and gray pixels.

3. Block Classification Process

In this process, the respective blocks, which are divided from the target image, are sequentially classified into one of a plurality of block categories including a white block, a color block, a gray block and a black block, based on the respective pixel categories of the plurality of pixels belonging to each block, in accordance with a block category order allotted to the block categories in advance. In this illustrative embodiment, the block category order is an order of white, color, gray and black blocks.

Specifically, the block classification process is implemented as follows.

In a jth classification, for each block, when a ratio $RP_j$ of the number of pixels, which is a ratio of the jth classified number of pixels $NP_j$ to the jth reference number of pixels $REFP_j$, is larger than a threshold value $THP_j$, each block is classified into the jth block category in the block category order. Here, j is an integer of 1 or larger. Here, the jth classified number of pixels $NP_j$ is the number of pixels classified into a jth pixel category in the pixel category order.

4. Output Mode Selection Process

In this process, based on the block category of each of the blocks, which are divided from the target image, an image output mode of the target image is sequentially selected as one of a plurality of output modes including a white output mode, a color output mode, a gray output mode and a monochrome output mode in accordance with an output mode order allotted to the output modes in advance. In this illustrative embodiment, the output mode order is an order of a white output mode, i.e., a blank page mode, a color output mode, a gray output mode and a monochrome output mode.

Specifically, the output mode selection process is implemented as follows.

In an ith selection, when a ratio $RB_i$ of the number of blocks, which is a ratio of the ith classified number of blocks $NB_i$ to the ith reference number of blocks $REFB_i$, is larger than a threshold value $THB_i$, the ith output mode in the output mode order is selected as the image output mode of the target image. Here, I is an integer of 1 or larger. Here, the ith classified number of blocks $NB_i$ is the number of blocks divided from the target image that is classified into an ith block category in the block category order.

The effects of the image processing method developed as described above, which is hereinafter, referred to as "developed method", are specifically described with reference to the first and second image examples.

Figures 4A, 4B, 4C:
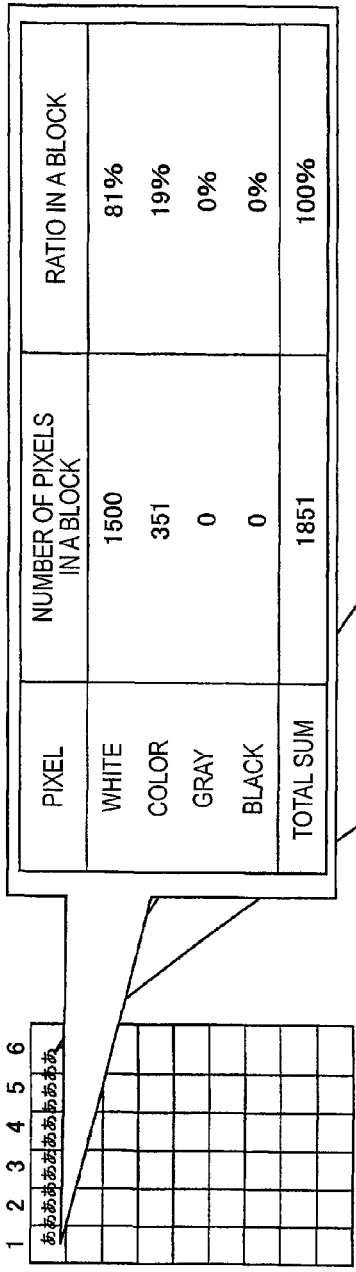
FIG. 4 (4A, 4B, 4C) is a view illustrating function effects of an image processing method that is executed by the image reading apparatus shown in FIG. 1.

FIG. 4 shows a result that is obtained by implementing the block classification process to the first image example shown in FIG. 3A. Specifically, FIG. 4A shows that the target image is divided into a plurality of blocks with respect to the first image example and that for the first block of the plurality of blocks, the classified number of pixels in the block and the ratio of the number of pixels in the block are acquired for each pixel category. In the first block, the red letter exists by at least one letter.

FIG. 4B shows that for the sixth block of the plurality of blocks, the classified number of pixels in the block and the ratio of the number of pixels in the block are acquired for each pixel category. In the sixth block, the black letter exists by about 1.5 letters. FIG. 4C shows the threshold values that are used to classify the respective blocks into one of the white block, the color block, the gray block and the black block.

As shown at the rightmost side of FIG. 4A, since the ratio of the number of color pixels is larger than the threshold value in the first block, the first block is classified into the color block. However, since the ratios of the numbers of the white pixel, the color pixel and the gray pixel respectively satisfies the condition of being the corresponding threshold values or smaller in the sixth block, the sixth block is classified into the black block.

A left side of FIG. 5A shows that the target image is divided into a plurality of blocks and a right side of FIG. 5A shows that the block classification process is performed for all the blocks, with respect to the first image example. At the right side of FIG. 5A, a symbol "C" indicates that a block having the symbol attached thereto is classified into the color block, a symbol "B" indicates that a block having the symbol attached thereto is classified into the black block and a symbol "W" indicates that a block having the symbol attached thereto is classified into the white block.

As shown in FIG. 5A, in the first image example that is a text image in which a plurality of letters is only in the first row of one page, the first and second blocks, in which the first and second red letters exist respectively, are classified into color blocks. The other blocks belonging to the same row and having the black letters are classified into black blocks. The other blocks having the background color is classified into white blocks.

Regarding the second image example shown in FIG. 3B, in which the image data has color pixels generated due to the color shift, a left side of FIG. 5B shows that the target image is divided into a plurality of blocks and the right side of FIG. 5B shows that the block classification process is performed for all the blocks.

As shown in FIG. 5B, in the second image example that is a text image in which a plurality of letters exists on the whole one page, when it is assumed that the color shift occurred to the image data of all black letters on the document, since at least one letter exists in each block, the unexpected color pixels exist in all of the blocks. Even when the total number of the unexpected color pixels exceeds a threshold value as a whole of the text, a number of the color pixels generated to the letters existing in the respective blocks are small for each of the blocks, compared to the first image example, so that the number of color pixels for each lock does not exceed the threshold value. Accordingly, all blocks are classified into the black block in the second image example.

According to the analysis of the classification results shown in FIGS. 5A and 5B, like the first image example, when the object in the target image is a text, a part of the letters configuring the text may be colored due to the highlighting. At this time, generally, each colored letter is colored entirely. Accordingly, when at least one colored letter exists in a block, the color pixels tend to intensively occur in the corresponding block. Hence, the number of color pixels tends to increase in the block in which the color letter exists. Thus, as shown in FIG. 5A, the block in which the color letter exists shows a strong tendency that to be classified into the color block.

In contrast to this, like the second image example, when the object in the target image is a text, although all the letters configuring the text are black and are not colored in another color for highlighting, the color shift may occur at the time of reading the image. In general, the color shift shows a strong tendency that it occurs over the entire text, not locally. Also, the color shift shows a strong tendency that it does not occur over the entire letter but partially occurs only at the surroundings of an outline of each letter.

Hence, the image data, which is obtained by reading the text having the color shift, has a possibility that, although the number of unexpected color pixels in a letter is smaller than that in the highlighted letters, since the unexpected color pixels are dispersed over the entire text, the number of unexpected color pixels in the whole text may be equal to or larger than the number of color pixels corresponding to the highlighted letters. That is, although the number of unexpected color pixels is a few from a local standpoint, if the number of letters to which the color shift occurs is large as a whole, the number of unexpected color pixels may be equal to or larger than the number of color pixels corresponding to the highlighted letters.

However, from a standpoint of a block unit, since the number of letters existing in each block is small, such as one letter, the number of unexpected color pixels in each block is also small, so that the ratio of the number of color pixels in each block does not exceed the threshold value.

Meanwhile, in order that the first image example and the second image example are correctly classified into the color image and the monochrome image, respectively, a following measure has been considered. That is, a threshold value that should be compared with the ratio of the number of color pixels of the whole document is set to be slightly higher, so that a result of classifying a document in which the image data has the expected color pixels and a result of classifying a document in which the image data has the unexpected color pixels are different.

However, by the above measure, in some cases, even the ratio of the number of color pixels of the document in which the image data has the expected color pixels may not exceed the threshold value set to be slightly higher, so that the document can not be classified into the color image.

Regarding the above problem, according to the developed method, the ratio of the number of color pixels is calculated in a block unit, so that the ratio of the number of color pixels is suppressed from being increased due to the color shift. As a result, the block in which the image data has the expected color pixels can be classified into the color block and a block in which the image data has the unexpected color pixels can be classified into the monochrome block, without setting the threshold value to be slightly higher.

That is, the illustrative embodiment pays attention to the fact that the unexpected color pixels generated due to the color shift have a tendency to disperse in a low density on the image data, i.e., document. In the illustrative embodiment, the target image is first classified in a pixel unit and is then classified in a block unit including a plurality of pixels, based on the first classification. Accordingly, it is possible to distinguish a case where the image data has the expected color pixels and a case where the image has the unexpected color pixels.

FIG. 5C shows a result that is obtained by performing the output mode selection process to the first image example and FIG. 5D shows a result that is obtained by performing the output mode selection process to the second image example.

FIG. 5E shows threshold values that are used to classify the target image into one of white, color, gray and monochrome images.

As shown in FIG. 5C, in the first image example, the ratio of the number of blocks of the color blocks satisfies the condition of being the threshold value or larger, so that the first image example is classified into the color image, as expected. Compared to this, as shown in FIG. 5D, in the second image example, since the ratios of the number of blocks of the white, color and gray blocks are smaller than the corresponding threshold values, respectively, the target image is classified into the monochrome image, as expected.

However, the inventors found that the suggested method needs to be improved.

Specifically, considering a case where one object is displayed in color in a sheet P of one page which is hereinafter referred to as "document", there are cases where a same object is displayed in large and small sizes on the document. The object displayed in a small size is obtained, for example, by reducing the object displayed in a large size, and the object displayed in a large size is obtained, for example, by enlarging the object displayed in a small size.

Ideally, it is natural that both the documents are classified into the color images and the color output mode is selected. However, since the document on which the object is displayed in a small size has the smaller number of color pixels occupying the whole document, compared to the document on which the object is displayed in a large size, the ratio of the number of color pixels is smaller.

Accordingly, regarding the document on which the object is displayed in a small size, the ratio of the number of color pixels is smaller than that of the document on which the object is largely displayed and thus does not exceed the threshold value and the corresponding document is classified into an image, for example, monochrome image, rather than the color image, so that the monochrome mode may be selected, even though it is natural that the document is to be classified into the color image.

That is, according to the suggested method, since the ratio of the number of color pixels has a strong tendency to depend on a size of a part of the document on which the color object is not displayed, i.e., a margin or a background part, the color characteristics of the image may not be correctly distinguished, so that an erroneous image output mode may be selected. Hereinafter, such a problem is specifically described with reference to the following specific image examples.

In a third image example shown in FIG. 6A, a color object is displayed in a slightly large area of the document. Compared to this, in a fourth image example shown in FIG. 6B, a color object that is a reduced object of the third image example is displayed in a small area of the document. FIG. 6C shows threshold values that are used to classify the target image of one page, i.e., image on the document, into one of white, color, gray and monochrome images.

It is natural that both the third and fourth image examples are classified into the color image. In the third image example, as can be clearly seen from the reading result at the rightmost of FIG. 6A, the ratio of the number of color pixels is 15%, which is larger than the threshold value of 2% shown in FIG. 6C. Accordingly, the third image example is classified into the color image, as expected.

However, in the fourth image example, as can clearly seen from the reading result at the rightmost of FIG. 6B, the ratio of the number of color pixels is 1.5%. Therefore, since the ratio of the number of color pixels in the fourth image example is smaller than the threshold value of 2% shown in FIG. 6C, the fourth image example is unexpectedly classified into the monochrome image.

Like this, according to the suggested method, when the area of the part on which the color object is not displayed, i.e., the area of the margin or background part, is large, the color characteristics of the image may not be resultantly distinguished correctly, so that an erroneous image output mode may be selected. This should be improved.

Regarding this, the inventors improved the suggested method so that the reference number of pixels is not fixed as the total number of pixels but is varied, i.e., is decreased as the pixel classification process is performed in the pixel category order. According to this improved suggested method, which is hereinafter referred to as "improved method", the output mode selection process is sequentially implemented in accordance with the pixel category order, as follows.

(1) In a first selection, when a ratio of the number of pixels RP1, which is a ratio of the first classified number of pixels NP1 to the first reference number of pixels REFP1, is larger than a threshold value THP1, a first output mode in the output mode order is selected as the image output mode of the target image. Here, the first number of pixels NP1 is the number of pixels configuring the target image, which is classified into a first pixel category in the pixel category order. Further, the "the first reference number of pixels REFP1" is the total number of pixels of the target image.

(2) In an ith selection, when a ratio RPi of the number of pixels that is a ratio of the ith classified number of pixels NPi to the ith reference number of pixels REFPi is larger than a threshold value THPi, an ith output mode in the output mode order is selected as the image output mode. Here, i is an integer of 2 or larger. Here, the ith classified number of pixels NPi is the number of pixels configuring the target image, which is classified into an ith pixel category of the pixel category order.

Here, the "the ith reference number of pixels REFPi" is a value that is obtained by subtracting the (i-1)th classified number of pixels NPi-1 from the (i-1)th reference number of pixels REFPi-1.

For example, the second reference number of pixels is the same as a value that is obtained by subtracting the number of white pixels from the total number of pixels. The second reference number of pixels is approximate to the number of pixels configuring a part, for example, object part, except for a white part, typically, margin part, of the whole document. Accordingly, the second ratio of the number of pixels is calculated without being influenced by the other white part as much as possible. As a result, a ratio of the object in the document to the document size influences the second ratio of the number of pixels only a little.

The effects of the improved method are specifically described with reference to the third and fourth image examples.

In the third image example, as shown in FIG. 7A, the ratio of the number of color pixels is 50%, which is larger than the threshold value of 2% shown in FIG. 6C. Hence, the third image example is classified into the color image, as expected. Also, in the fourth image example, as shown in FIG. 7B, the ratio of the number of color pixels is also 50%. Accordingly, since the fourth image example has the ratio of the number of color pixels that is larger than the threshold value of 2% shown in FIG. 6C, the fourth image example is also classified into the color image, as expected. Thereby, the misclassification of the target image, which is caused due to the size of the object in the document, is prevented.

The inventors paid attention to the fact that a configuration in which the target image is configured by the plurality of pixels and a configuration in which the target image is configured by the plurality of blocks are common in that the target image is configured by a plurality of partial images. Based on this, the inventors applied the above technical spirit of setting the reference number of pixels as a variable value to the "reference number of blocks" in the output mode selection process of the developed method. That is, the inventors set the reference number of blocks as a variable value in the output mode selection process. Specifically, the output mode selection process of the image processing method of this illustrative embodiment is implemented as follows.

(1) First Selection

In the first selection, when a ratio RB1 of the number of blocks, which is a ratio of the first classified number of blocks NB1 to the first reference number of blocks REFB1, is larger than a threshold value THB1, a first output mode in the output mode order is selected as the image output mode of the target image. In this illustrative embodiment, the first output mode is a white output mode. Here, the first classified number of blocks NB1 is, of the blocks divided from the target image, the number of blocks classified into a first block category in the block category order. In this illustrative embodiment, the first block category is a white block. Further, the "first reference number of blocks REFB1" is a total number of blocks of the target image.

(2) ith (i: integer of 2 or greater) Selection, i.e., second or subsequent selection In an ith selection, when a ratio RBi of the number of blocks, which is a ratio of the ith classified number of blocks NBi to the ith reference number of blocks REFBi, is larger than a threshold value THBi, an ith output mode of the output mode order is selected as the image output mode of the target image. Here, I is an integer of 2 or larger. Here, the ith classified number of blocks NBi is the number of blocks, of the blocks divided from the target image, classified into an ith block category of the block category order. Further, the "the ith reference number of blocks REFBi" is a value that is obtained by subtracting the (i-1)th classified number of blocks NBi-1 from the (i-1)th reference number of blocks REFBi-1.

That is, according to the illustrative embodiment, the reference number of blocks is not constant in all of the selections. That is, the reference number of blocks is the same as the total number of blocks in the first selection. However, in each of the second or subsequent selections, the reference number of blocks is the same as a value that is obtained by subtracting the classified number of blocks in a preceding selection from the reference number of blocks in the preceding selection and decreases as the number of the selection increases. Accordingly, the reference number of blocks that is used in each of the second and subsequent selection is defined so that the number of blocks, i.e., used blocks, noted in the selection of previous time is excluded therefrom. That is, the reference number of blocks that is used in each of the second and subsequent selection is defined so that the classified number of blocks of a previous selection is excluded therefrom. Hence, the ratio of the number of pixels calculated at the selection of this time is prevented from becoming an unexpectedly small value due to the reference number of blocks of this time including the number of used blocks, which exist before the selection of this time, being increased, and the unexpected image output mode being erroneously selected for the image is prevented.

Also, the inventors paid attention to the fact that the configuration in which the target image is configured by the plurality of pixels and the configuration in which each block is configured by the plurality of pixels are common in that the image area is configured by a plurality of pixels. Based on this, the inventors applied the above technical spirit of setting the reference number of pixels as a variable value to the "reference number of pixels" in the block classification process of the developed method. That is, the inventors set the reference number of pixels as a variable value in the block classification process. Specifically, the block classification process of the image processing method of this illustrative embodiment is implemented as follows.

(1) First Classification

In the first classification, when a ratio RP1 of the number of pixels that is a ratio of the first classified number of pixels NP1 to the first reference number of pixels REFP1 is larger than a threshold value THP1, each block is classified into a first block category, in this illustrative embodiment, white block, in the block category order. Here, the first classified number of pixels NP1 is the number of pixels, of the pixels, i.e., the extracted pixels, belonging to each block, classified into a first pixel category, in this illustrative embodiment, white pixel, of the pixel category order. Further, the "first reference number of pixels REFP1" is the same as the total number of pixels belonging to each block.

(2) jth (j: integer of 2 or greater) Classification, i.e., second or subsequent classifications In a jth classification, when a ratio RPj of the number of pixels that is a ratio of the jth classified number of pixels NPj to the jth reference number of pixels REFPj is larger than a threshold value THPj, each block is classified into a jth block category of the block category order. Here, the jth classified number of pixels NPj is the number of pixels, of the pixels belonging to each block, classified into a jth pixel category in the pixel category order. Here, the "the jth reference number of pixels REFPj" is a value that is obtained by subtracting the (j-1)th classified number of pixels NPj-1 from the (j-1)th reference number of pixels REFPj-1.

Adding a remark, in this illustrative embodiment, the above technical spirit of setting the reference number of pixels as a variable value is applied to the reference number of pixels in the block selection process and the reference number of blocks in the output mode selection process. However, the invention can be implemented by applying the technical spirit to at least the reference number of blocks. Also, the above technical spirit of setting the reference number of pixels as a variable value may be applied to at least the reference number of pixels.

In order to implement the image processing method of this illustrative embodiment, which has been schematically described, an image processing program shown in FIG. 8 is executed.

Figure 9:
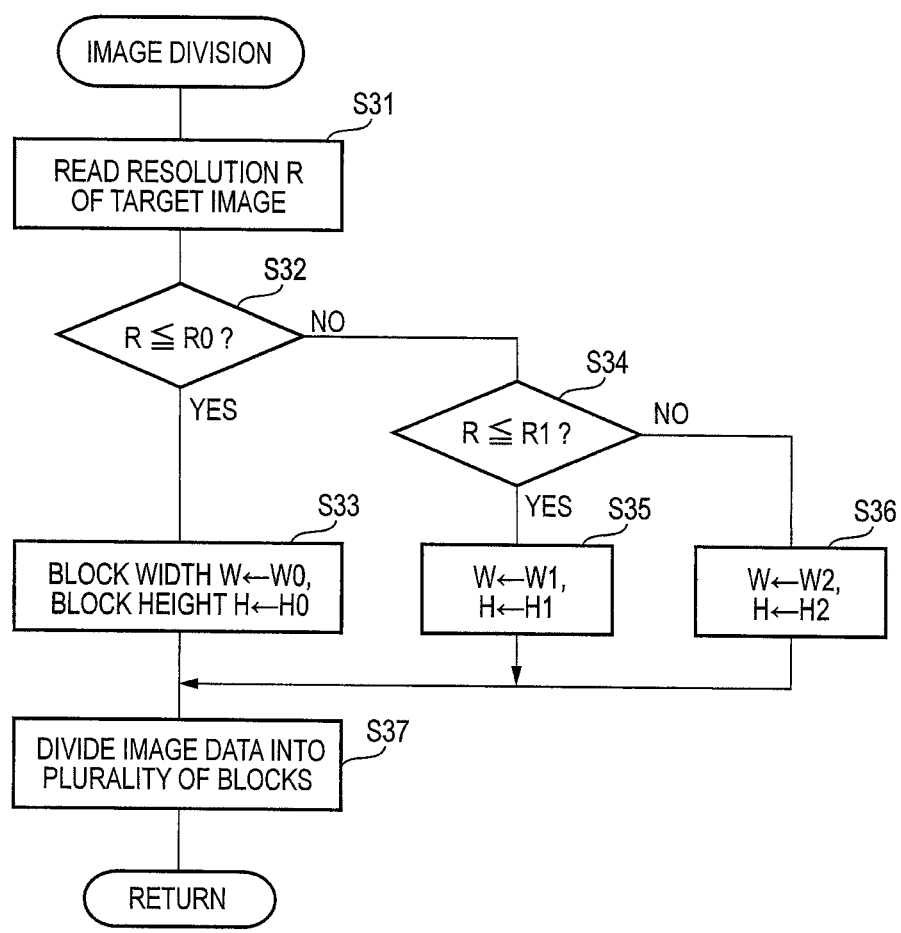
FIG. 9 is a flowchart conceptually showing details of S1 of FIG. 8.

When the image processing program is executed, in S1, an image hereinafter referred to as "target image", which is displayed by the image data of one page stored in the RAM 100, is divided into a plurality of blocks including a plurality of pixels adjacent to each other. The details of S1 are conceptually shown in a flowchart of FIG. 9, as an image division routine.

In the image division routine, in S31, a resolution R of the image data that displays the target image is read out from the RAM 100. The data indicating the resolution R is included in or associated with this image data.

Then, in S32 to S36, a target size of each of the blocks into which the target image should be divided is set to be larger as the read resolution R is higher.

Specifically, in S32, it is determined whether the resolution R is the minimum threshold value R0, for example, 300 [dpi], or lower. This determination corresponds to a determination of determining whether a size of the target image is A4 size or not. This time, when it is assumed that the resolution R is the threshold value R0 or lower, a target size of one block is set in S33 so that a block width W is W0, for example, 16 [pixel], and a block height H is H0, for example, 16 [pixel].

On the other hand, when the resolution R is higher than the threshold value R0, it is determined in S34 whether the resolution R is a threshold value R1 or lower, which is larger than the threshold value R0. This determination corresponds to a determination of determining whether a size of the target image is B size or not, for example. This time, when it is assumed that the resolution R is the threshold value R1 or lower, a target size of one block is set in S35 so that the block width W is W1 (>W0) and the block height H is H1 (>H0).

On the other hand, when the resolution R is higher than the threshold value R1, a target size of one block is set in S36 so that the block width W is W2 (>W1) and the block height H is H2 (>H1).

In any case, based on the image data, i.e., original image data, of the target image, the target image is divided into a plurality of blocks in S37 so that each block has a target size that is increased as the resolution R is increased. Thereby, a set of a plurality of block data indicating the blocks is generated as image data after the division. After the division, the image data is preserved in the RAM 100. As a result, the execution of the image division routine is ended and the process returns to S2 of FIG. 8.

Figure 10:
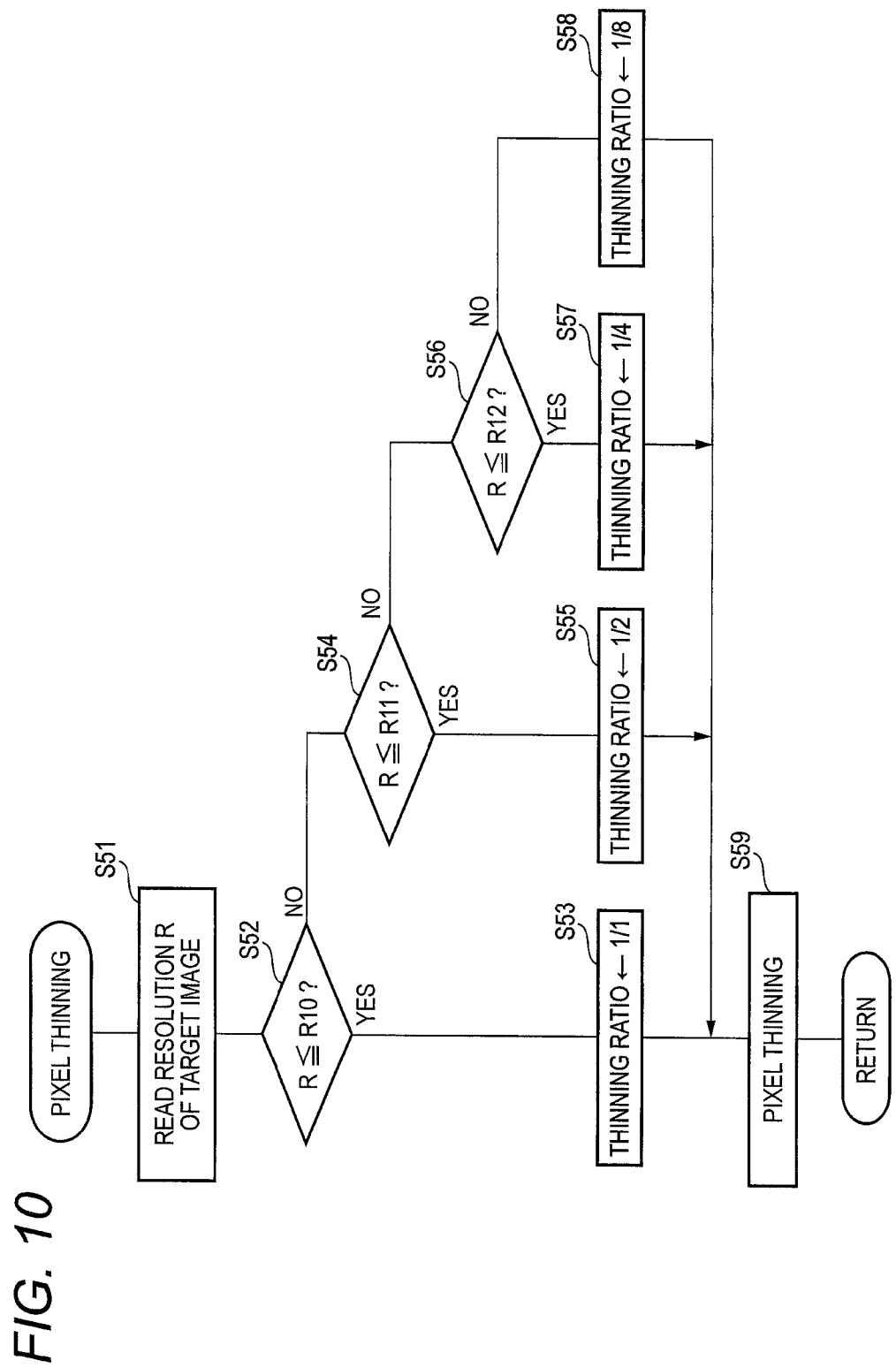
FIG. 10 is a flowchart conceptually showing details of S2 of FIG. 8.

In S2, a thinning of the pixel is performed. The details of S2 are conceptually shown in a flowchart of FIG. 10, as a pixel thinning routine.

In the pixel thinning process, in S51, the resolution R of the image data indicating the target image is read out from the RAM 100. Then, in S52 to S59, a thinning ratio of the pixel is set so that it is decreased as the resolution R is higher.

The term "thinning ratio" means a ratio of the number of pixels of the target image after the thinning to the number of pixels of the target image before the thinning When the thinning ratio is expressed by "1/k", it means that one pixel of k pixels is extracted as an effective pixel and (k-1) pixels of k pixels are skipped. Here, k is an integer of 1 or larger. The lower the thinning ratio, the number of skipped pixels of a plurality of pixels originally belonging to the target image is increased.

Specifically, in S52, it is determined whether the resolution R is the minimum threshold value R10 or lower. This time, when it is assumed that the resolution R is the threshold value R10 or lower, the thinning ratio is set 1/1 in S53. The thinning ratio of 1/1 means that the thinning is not performed for the target image and all pixels configuring the target image are extracted as the effective pixels.

On the other hand, when the resolution R is higher than the threshold value R10, it is determined in S54 whether the resolution R is a threshold value R11 or lower, which is larger than the threshold value R10. This time, when it is assumed that the resolution R is the threshold value R11 or lower, the thinning ratio is set 1/2 in S55. The thinning ratio of 1/2 means that one pixel to two pixels with respect to the pixels configuring the target image is extracted and the other one pixel is skipped.

On the other hand, when the resolution R is higher than the threshold value R11, it is determined in S56 whether the resolution R is a threshold value R12 or lower, which is larger than the threshold value R11. This time, when it is assumed that the resolution R is the threshold value R12 or lower, the thinning ratio is set 1/4 in S57. The thinning ratio of 1/4 means that one pixel to four pixels with respect to the pixels configuring the target image is extracted and the other three pixels are skipped.

On the other hand, when the resolution R is higher than the threshold value R12, the thinning ratio is set 1/8 in S58. The thinning ratio of 1/8 means that one pixel to eight pixels with respect to the pixels configuring the target image is extracted and the other seven pixels are skipped.

In any case, in S59, the plurality of pixel data configuring the image data of the target image is thinned with the thinning ratio, which is decreased as the resolution R becomes higher, so that a plurality of effective pixel data is extracted. The effective image data is preserved in the RAM 100. Thereby, the target image is divided into a plurality of blocks so that each block has only the effective pixels. As a result, the execution of the pixel thinning routine is ended and the process returns to S3 of FIG. 8.

In S3, when it is supposed that the blocks belonging to the target image are laid out in a row, a leading block is selected as a target block. Subsequently, in S4, when it is supposed that a plurality of pixels belonging to the target block is laid out in a row, a leading pixel is selected as a target pixel. Here, although the pixels are the effective pixels extracted by the thinning of S2, each of them are simply referred to as "pixel".

Figure 11:
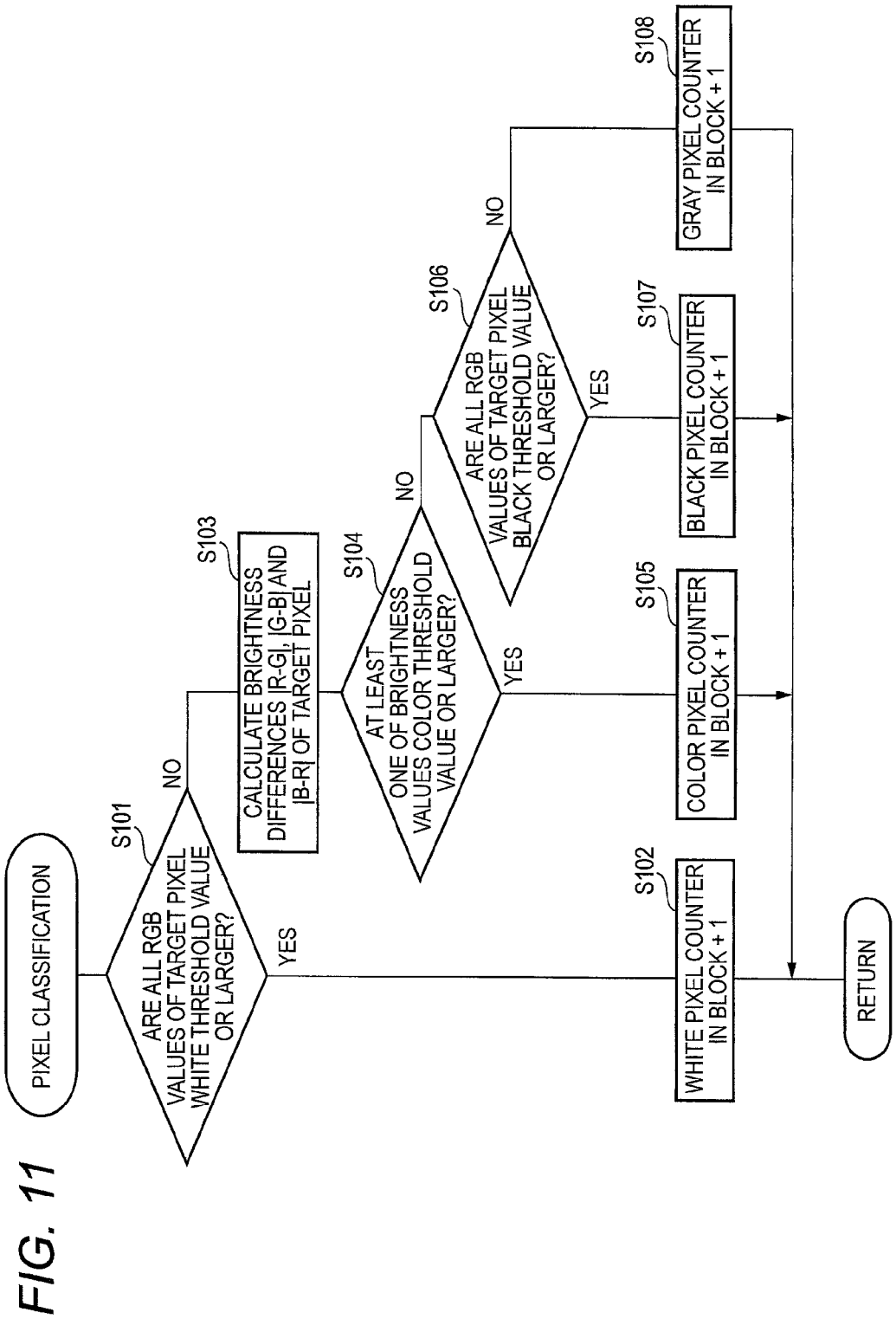
FIG. 11 is a flowchart conceptually showing details of S5 of FIG. 8.

Then, in S5, the target pixel is classified into one of a white pixel, a color pixel, a gray pixel and a black pixel. The details of S5 are conceptually shown in a flowchart of FIG. 11, as a pixel classification routine.

In the pixel classification routine, in S101, regarding the target pixel, it is determined whether all the R, G and B values are a white threshold value, for example, "240", or larger, which is a threshold value for classifying the target pixel as a white pixel. Regarding the target pixel, when it is assumed that all the RGB values are the white threshold value or larger, the target pixel is classified into a white pixel. Then, in S102, regarding the target pixel, a block white pixel counter for counting the number of white pixels existing in the target block is incremented by 1. As a result, one execution of the pixel classification routine is ended and the process returns to S6 of FIG. 8.

On the other hand, regarding the target pixel, when it is assumed that at least one of the RGB values is smaller than the white threshold value, a brightness difference |R−G| between red and green, i.e., an absolute value of a difference between R and G brightness values, a brightness difference |G−B| between green and blue, i.e., an absolute value of a difference between G and B brightness values, and a brightness difference |B−R| between blue and red, i.e., an absolute value of a difference between B and R brightness values, are calculated for the target pixel in S103.

Subsequently, regarding the target pixel, it is determined in S104 whether at least one of the three brightness values is a color threshold value, for example, "10", which is a threshold value for classifying the target pixel as a color pixel or larger,. Regarding the target pixel, when it is assumed that at least one of the three brightness differences is the color threshold value or larger, the target pixel is classified into a color pixel. Then, in S105, regarding the target block, a block color pixel counter for counting the number of color pixels existing in the target block is incremented by 1. As a result, one execution of the pixel classification routine is ended and the process returns to S6 of FIG. 8.

On the other hand, regarding the target pixel, when it is assumed that any brightness difference is smaller than the color threshold value, it is determined for the target pixel whether all the R, G and B values are a black threshold value, for example, "50", or smaller, which is a threshold value for classifying the target pixel as a black pixel. Regarding the target pixel, when it is assumed that all the RGB values are the black threshold value or smaller, the target pixel is classified into a black pixel. Then, in S107, regarding the target block, a black pixel counter in a block for counting the number of black pixels existing in the target block is incremented by 1. As a result, one execution of the pixel classification routine is ended and the process returns to S6 of FIG. 8.

On the other hand, regarding the target pixel, when it is assumed that at least one of the RGB values is larger than the black threshold value, the target pixel is classified into a gray pixel. Then, in S108, regarding the target block, a block gray pixel counter for counting the number of gray pixels existing in the target block is incremented by 1. As a result, one execution of the pixel classification routine is ended and the process returns to S6 of FIG. 8.

In S6 of FIG. 8, it is determined whether the execution of S5 is ended for all pixels belonging to the target block. When it is assumed that the execution is not ended yet, the target pixel is moved to a pixel following the current pixel in S7. Subsequently, returning to S5, the S5 is executed for a next pixel. On the other hand, when it is assumed that the execution of S5 is ended for all pixels belonging to the target block, the process proceeds to S8.

Figure 12:
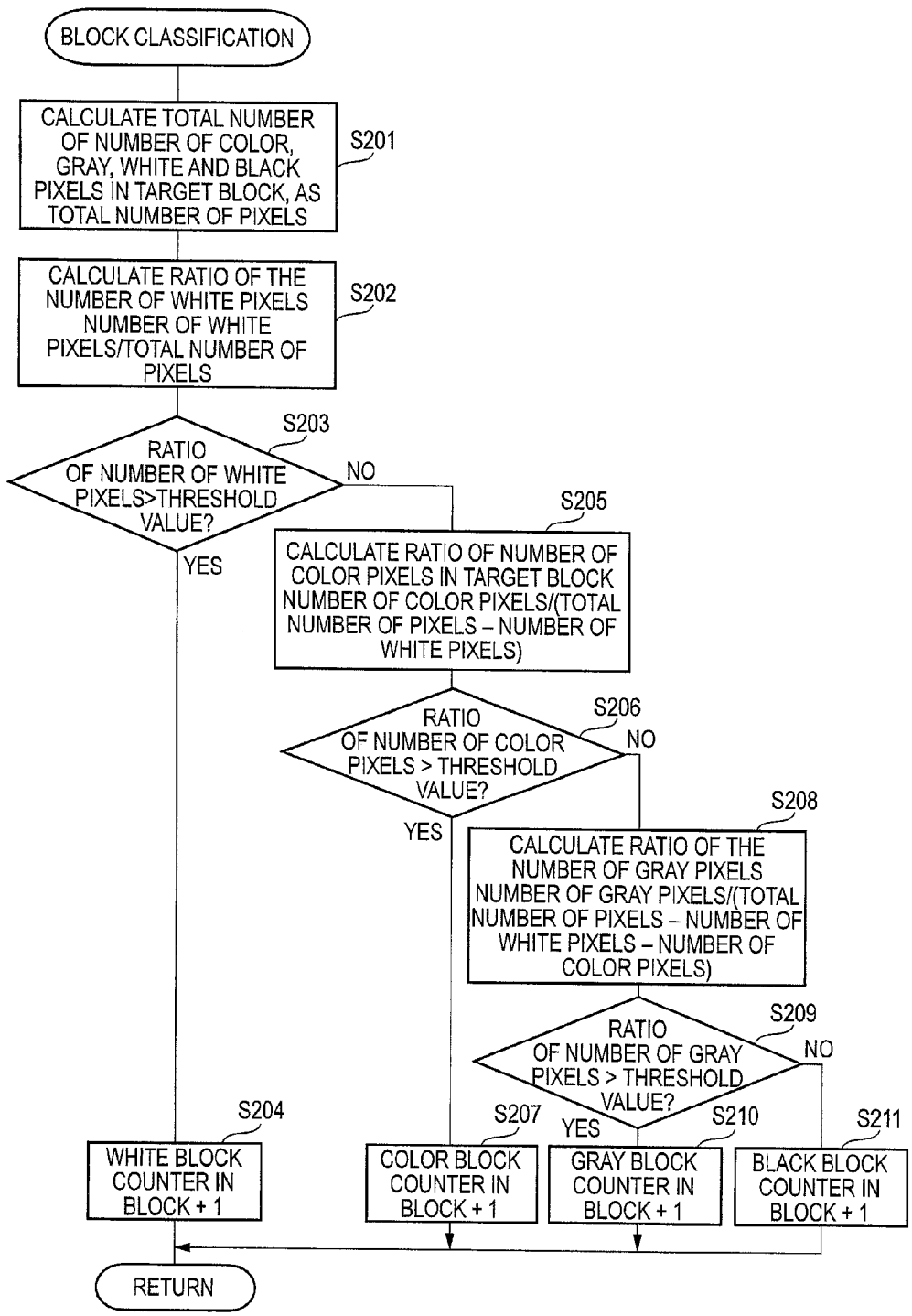
FIG. 12 is a flowchart conceptually showing details of S8 of FIG. 8.

In S8, the target block is classified into one of white, color, gray and black blocks. The details of S8 are conceptually shown in a flowchart of FIG. 12, as a block classification routine.

In the block classification routine, in S201, regarding the target block, the values of the four pixel counters are summed up, so that a total sum of the number of white pixels, i.e., a value of the block white pixel counter), the number of color pixels, i.e., a value of the block color pixel counter, the number of black pixels, i.e., a value of the black pixel counter in a block and the number of gray pixels, i.e., a value of the block gray pixel counter, which belong to the target block, is calculated as the total number of pixels of the target block.

Subsequently, in S202, regarding the target block, a ratio of the number of white pixels is calculated by dividing the number of white pixels by the first reference number of pixels. The first reference number of pixels is the calculated total number of pixels.

Then, in S203, it is determined whether the calculated ratio of the number of white pixels is larger than a threshold value for white block for classifying the target block as a white block. Regarding the target block, when it is assumed that the ratio of the number of white pixels is higher than the threshold value for white block, the target block is classified into a white block. Then, in S204, regarding the target image, a white block counter for counting the number of white blocks existing in the target image is incremented by 1. As a result, one execution of the block classification routine is ended and the process returns to S9 of FIG. 8.

On the other hand, regarding the target block, when it is assumed that the ratio of the number of white pixels is the threshold value for white block or lower, a ratio of the number of color pixels is calculated by dividing the number of color pixels by the second reference number of pixels with respect to the target block, in S205. The second reference number of pixels is a value that is obtained by subtracting the number of white pixels from the first reference number of pixels, i.e., total number of pixels.

Then, in S206, it is determined whether the calculated ratio of the number of color pixels is higher than a threshold value for color block for classifying the target block as a color block. Regarding the target block, when it is assumed that the ratio of the number of color pixels is higher than the threshold value for color block, the target block is classified into a color block. Then, in S207, regarding the target image, a color block counter for counting the number of color blocks existing in the target image is incremented by 1. As a result, one execution of the block classification routine is ended and the process returns to S9 of FIG. 8.

On the other hand, regarding the target block, when it is assumed that the ratio of the number of color pixels is the threshold value for color block or lower, a ratio of the number of gray pixels is calculated by dividing the number of gray pixels by the third reference number of pixels with respect to the target block, in S208. The third reference number of pixels is a value that is obtained by subtracting the number of color pixels from the second reference number of pixels, which is a value that is obtained by subtracting the number of white pixels and the number of color pixels from the first reference number of pixels, i.e., total number of pixels.

Then, in S209, it is determined whether the calculated ratio of the number of gray pixels is higher than a threshold value for gray block for classifying the target block as a gray block. Regarding the target block, when it is assumed that the ratio of the number of gray pixels is higher than a threshold value for gray block, the target block is classified into a gray block. Then, in S210, regarding the target image, a gray block counter for counting the number of gray blocks existing in the target image is incremented by 1. As a result, one execution of the block classification routine is ended and the process returns to S9 of FIG. 8.

On the other hand, regarding the target block, when it is assumed that the ratio of the number of gray pixels is the threshold value for gray block or lower, the target block is classified into a black block. Then, in S211, regarding the target image, a black block counter for counting the number of black blocks existing in the target image is incremented by 1. As a result, one execution of the block classification routine is ended and the process returns to S9 of FIG. 8.

In S9 of FIG. 8, it is determined whether the execution of S8 is ended for all blocks belonging to the target image. This time, when it is assumed that the execution has not ended yet, the target block is moved to a block following the current block, in S10. Subsequently, the process returns to S4 and S4 is executed for a next block. On the other hand, when it is assumed that the execution of S8 is ended for all blocks belonging to the target image, the process proceeds to S11.

Figure 13A:
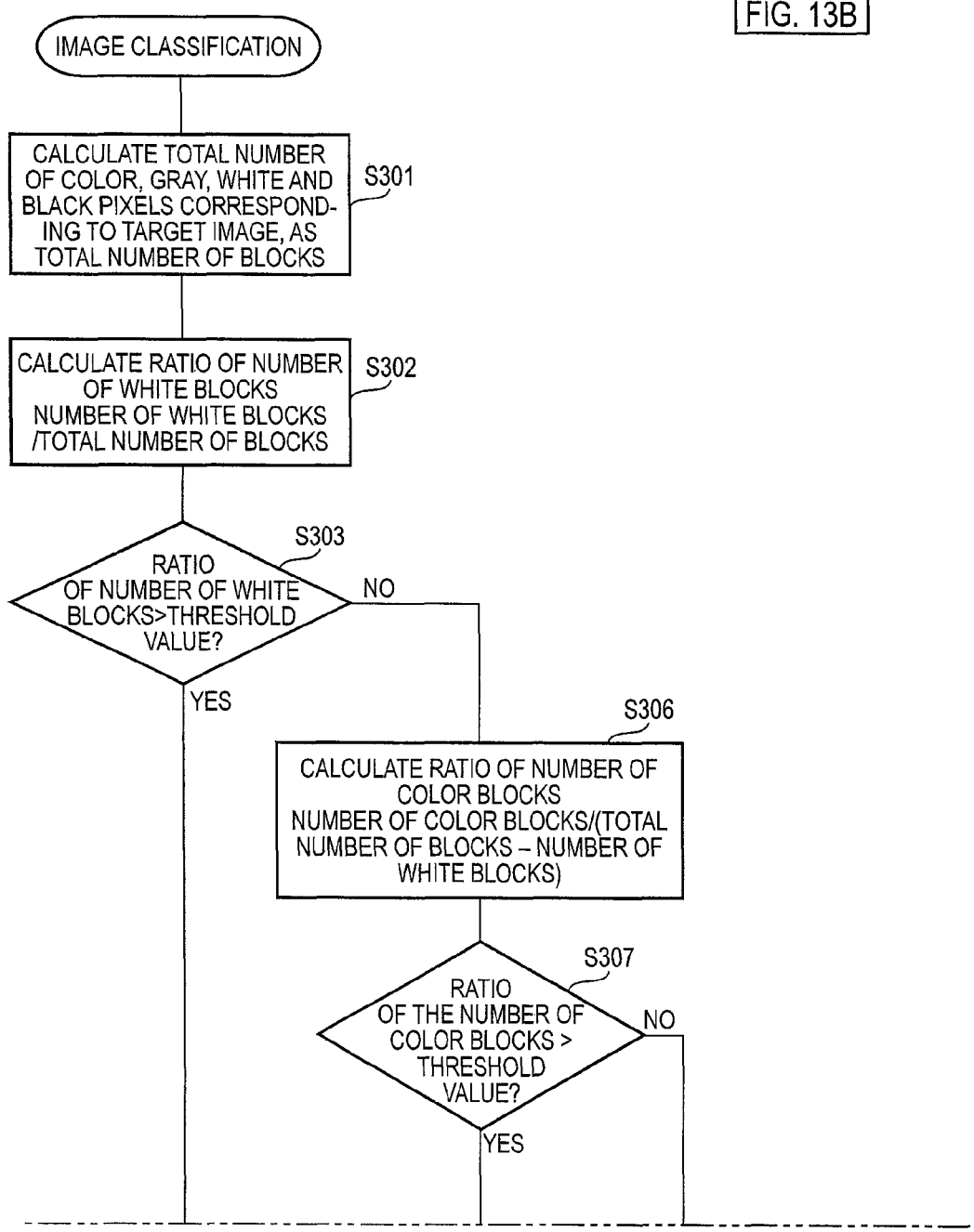
FIG. 13 (13A, 13B) is a flowchart conceptually showing details of S11 of FIG. 8.

In S11, the target image is classified into one of a white image, i.e., a blank page, a color image, a gray image and a monochrome image. The details of S11 are conceptually shown in a flowchart of FIG. 13 (13A, 13B), as an image classification routine.

In the image classification routine, in S301, regarding the target image, the values of the four block counters are summed up, so that a total sum of the number of white blocks, i.e., the value of the white block counter, the number of color blocks, i.e., the value of the color block counter, the number of black blocks, i.e., the value of the black block counter and the number of gray blocks, i.e., the value of the gray block counter, which belong to the target image, is calculated as the total number of blocks for the target image.

Subsequently, in S302, regarding the target image, a ratio of the number of white blocks is calculated by dividing the number of white blocks by the first reference number of blocks. The first reference number of blocks is the calculated total number of blocks.

Then, in S303, it is determined whether the calculated ratio of the number of white blocks is higher than a threshold value for blank page for classifying the target image as a blank page, i.e., a page having a background color in the entire page.

Regarding the target image, when it is assumed that the ratio of the number of white blocks is higher than the threshold value for blank page, the target image is classified into a blank page, in S304.

Then, in S305, the image data indicating the target image is converted into monochrome. Specifically, regarding all the pixels, the image data is converted so that each of the RGB values indicates "255." The information indicating that the target image is a blank page is added to a header of the converted image data, which is then stored in the RAM 100. As a result, one execution of the image classification routine is ended and the process returns to S12 of FIG. 8.

On the other hand, when it is assumed that the ratio of the number of white blocks is the threshold value for blank page or lower, a ratio of the number of color blocks is calculated by dividing the number of color blocks by the second reference number of blocks with respect to the target image, in S306. The second reference number of blocks is a value that is obtained by subtracting the number of white blocks from the first reference number of blocks, i.e., total number of blocks.

Then, in S307, it is determined whether the calculated ratio of the number of color blocks is higher than a threshold value for color image for classifying the target image as a color image. Regarding the target image, when it is assumed that the ratio of the number of color blocks is higher than the threshold value for color image, the target image is classified into a color image in S308. The information indicating that the target image is a color image is added to a header of the image data of the target image, which is then stored in the RAM 100. As a result, one execution of the image classification routine is ended and the process returns to S12 of FIG. 8.

On the other hand, regarding the target image, when it is assumed that the ratio of the number of color blocks is the threshold value for color image or lower, a ratio of the number of gray blocks is calculated by dividing the number of gray blocks by the third reference number of blocks with respect to the target image, in S309. The third reference number of blocks is the same as a value that is obtained by subtracting the number of color blocks from the second reference number of blocks, which is the same as a value that is obtained by subtracting the number of white blocks and the number of color blocks from the first reference number of blocks, i.e., total number of blocks.

Then, in S310, it is determined whether the calculated ratio of the number of gray blocks is higher than a threshold value for gray image for classifying the target image as a gray image. Regarding the target image, when it is assumed that the ratio of the number of gray blocks is higher than the threshold value for gray image, the target image is classified into a gray image in S311.

Then, in S312, the image data indicating the target image is converted into gray. Specifically, for example, regarding all the pixels, based on the respective RGB values, gradation conversion of a predetermined number of gradations, for example, 256 gradations, is performed, so that the image data before conversion is converted into image data indicating a gradation image. The information indicating that the target image is a gray image is added to a header of the converted image data, which is then stored in the RAM 100. As a result, one execution of the image classification routine is ended and the process returns to S12 of FIG. 8.

On the other hand, regarding the target image, when it is assumed that a ratio of the number of gray blocks is the threshold value for gray image or lower, the target image is classified into a monochrome image in S313.

Then, in S314, the image data indicating the target image is converted into monochrome. Specifically, regarding all the pixels, average values of the R values, the B values and the G values are calculated, and based on the average values, the image data before conversion is converted into image data indicating binary. The information indicating that the target image is a monochrome image is added to a header of the converted image data, which is then stored in the RAM 100. As a result, one execution of the image classification routine is ended and the process returns to S12 of FIG. 8.

In S12, the image data that is processed with respect to the target image is output from the RAM 100 to the PC 110 through the communication I/F 102. As a result, the execution of the image processing program is ended. The PC 110 having received the image data prints or displays the target image, based on the received image data and the output mode added to the header of the image data, as required.

Additionally, the invention can also be implemented by variously modifying the above-described illustrative embodiment.

For example, in the above-described illustrative embodiment, the target size of the block into which the target image should be divided is set based on the resolution of the image data of the target image. However, the target size may be set based on other parameters.

For example, when the target image is a text, the target size of the block may be set so that at least one letter exists in each block, based on font data of a letter, space data between the letters, and the like.

Also, in the above-described illustrative embodiment, when the target image is classified into a blank page, the image data before conversion is converted into the image data indicating that the entire image has a background color, i.e., white. However, the target image, i.e., the image data corresponding to the current page may be deleted from the image processing target, for example, data that should be transmitted to the PC 110, without performing the data conversion. That is, since the target image of this time is a white sheet, it is not necessary to print or display the target image thereafter.

Also, in the above-described illustrative embodiment, the pixel classification, i.e., identification of the color characteristics of the pixel, process is performed in the order of white pixel determination, color pixel determination and black/gray pixel determination, the block classification, i.e., identification of the color characteristics of the block, process is performed in the order of white block determination, color block determination and gray/black block determination, the image classification, i.e., identification of the color characteristics of the image or document of one page, process is performed in the order of blank page determination, color image determination and gray/black image determination. However, the determination order may be changed in each classification process.

Also, there is no limitation to the determination order among the three types of classification processes. Accordingly, the determination order in each classification process may be independently determined.

Also, in the above-described illustrative embodiment, the image that is read by the image reading apparatus 10 is processed by the CPU 94 of the image reading apparatus 10. However, the processing unit is not limited to the CPU 94. For example, the processing may be performed by an external apparatus such as PC connected to the image reading apparatus 10 through the communication I/F 102. In this case, the PC acquires the data of the image that is read from the sheet P by the image reading apparatus 10, and performs the necessary image processing to the data.

Also, in the above-described illustrative embodiment, as an example of the image processing apparatus of the invention, the image reading apparatus 10, which is a so-called sheet feed scan type of reading an image while conveying the sheet P, is adopted. However, the image processing apparatus of the invention is not limited thereto and a flat bed-type scanner, a facsimile apparatus, a multifunctional machine and the like may also be adopted.

Also, in the above-described illustrative embodiment, the image output mode of outputting the image, based on the image data of corresponding one page, is selected. However, the invention is not limited thereto. For example, an image output mode of outputting a plurality of images, based on image data of a plurality of corresponding pages, may be collectively selected commonly to the images.

Also, in the above-described illustrative embodiment, each pixel is classified into one of the plurality of pixel categories including the white pixel, the color pixel, the black pixel and the gray pixel. However, the invention is not limited thereto. For example, each pixel may be classified into one of a predetermined number of pixel categories, the predetermined number being smaller than a number of the pixel categories of the above-described illustrative embodiment. For example, each pixel may be classified into one of the pixel categories including only the white pixel and the black pixel. Also, the color pixel may be segmented into R, G and B pixels, so that the color pixel may be classified into one of the R, G and B pixels.

Although the illustrative embodiments of the invention have been described with reference to the drawings, the invention is not limited thereto. The illustrative embodiments of the invention are exemplary and can be variously modified and improved, based on the knowledge of one skilled in the art.

According to the illustrative embodiments, regarding the target image, the classification is first performed in a pixel unit. Then, based on the classification result, the classification is performed in a block unit including a plurality of pixels. Finally, the target image is classified. Accordingly, a possibility in which an image, which does not actually have a color pixel, will be misclassified into a color image due to the color shift at the time of reading the image, is reduced.

Also, according to the illustrative embodiments, since the reference number of blocks, which is used in the image output mode determination of each of the second or subsequent determination, is a variable value that is set so as not to include the number of blocks focused in the preceding determination, i.e., the classified number of blocks in the preceding determination, the reference number of blocks is smaller than a fixed value that is set to include the classified number of blocks in the preceding determination. As a result, the ratio that is calculated in the determination does not become an unexpected small value, so that a possibility that an unexpected image output mode will be erroneously selected for the target image is reduced.

What is claimed is:

1. An image processing apparatus that selects, based on data of an image that is acquired, an image output mode for outputting the image from one of a plurality of output modes, the image processing apparatus comprising:
   a pixel classification unit that classifies each pixel of the image into one of a plurality of pixel categories based on the image data of each pixel;
   an image division unit that divides the image into a plurality of blocks, the plurality of blocks each including a plurality of pixels adjacent to each other;
   a block classification unit that classifies each of the plurality of blocks into one of a plurality of block categories based on the pixel category of each of the plurality of pixels belonging to each of the plurality of blocks; and
   an output mode selection unit that selects the image output mode by sequentially determining, in accordance with an output mode order allotted to the plurality of output modes, whether or not to select one of the plurality of output modes as the image output mode, based on a ratio of a classified number of blocks, which is a number of blocks classified into each block category, to a reference number of blocks,
   wherein the output mode selection unit selects the image output mode after the block classification unit has classified each of the plurality of blocks into one of the plurality of block categories,
   wherein the plurality of output modes includes at least a first output mode and a second output mode, the first output mode being prior to the second output mode in the output mode order,
   wherein, in a first determination in the output mode order, the output mode selection unit determines whether or not to select the first output mode as the image output mode based on a ratio of a first classified number of blocks, which is a number of blocks classified into a first block category, to a first reference number of blocks, which is a total number of the plurality of blocks of the image, and
   wherein, in a second determination in the output mode order, the output mode selection unit determines whether or not to select the second output mode as the image output mode based on a ratio of a second classified number of blocks, which is a number of blocks classified into a second block category, to a second reference number of blocks, which is a value obtained by subtracting the first classified number of blocks from the first reference number of blocks.

2. The image processing apparatus according to claim 1, wherein the block classification unit classifies each block into one of the plurality of block categories by sequentially determining whether or not to classify each block into one of the plurality of blocks in accordance with a block category order allotted to the plurality of block categories, based on a ratio of a classified number of pixels, which is a number of pixels classified into each pixel category, to a reference number of pixels, and
wherein in a first determination in the block category order by the block classification unit, the reference number of pixels is a total number of pixels of the image, and in a second or subsequent determination in the block category order by the block classification unit, the reference number of blocks is a value that is obtained by subtracting the classified number of pixels in a preceding determination in the block category order by the block classification unit from the reference number of pixels in the preceding determination in the block category order by the block classification unit.

3. The image processing apparatus according to claim 1, wherein the image division unit divides the image into the plurality of blocks so that each block has a larger size as a resolution of the image data is higher.

4. The image processing apparatus according to claim 1, further comprising a thinning unit that thins the plurality of pixels with a thinning ratio that is decreased as a resolution of the image data increases, and thereby extracts a plurality of effective pixels, which are pixels to be classified by the pixel classification unit, from the plurality of pixels.

5. An image processing method for selecting, based on data of an image that is acquired, an image output mode for outputting the image from one of a plurality of output modes, the image processing method comprising:

classifying each pixel of the image into one of a plurality of pixel categories based on the image data of each pixel;

dividing the image into a plurality of blocks, the plurality of blocks each including a plurality of pixels adjacent to each other;

classifying each of the plurality of blocks into one of a plurality of block categories based on the pixel category of each of the plurality of pixels belonging to each of the plurality of blocks; and selecting the image output mode by sequentially determining, in accordance with an output mode order allotted to the plurality of output modes, whether or not to select one of the plurality of output modes as the image output mode, based on a ratio of a classified number of blocks, which is a number of blocks classified into each block category, to a reference number of blocks, wherein the selecting the image output mode is performed after the classifying each of the plurality of blocks into one of the plurality of block categories, wherein the plurality of output modes includes at least a first output mode and a second output mode, the first output mode being prior to the second output mode in the output mode order, wherein, in a first determination in the output mode order, determining whether or not to select the first output mode as the image output mode based on a ratio of a first classified number of blocks, which is a number of blocks classified into a first block category, to a first reference number of blocks, which is a total number of the plurality of blocks of the image, and wherein, in a second determination in the output mode order, determining whether or not to select the second output mode as the image output mode based on a ratio of a second classified number of blocks, which is a number of blocks classified into a second block category, to a second reference number of blocks, which is a value obtained by subtracting the first classified number of blocks from the first reference number of blocks.

6. A non-transitory computer readable recording medium storing a computer program for causing a computer to perform an image processing method of selecting, based on data of an image that is acquired, an image output mode for outputting the image from one of a plurality of output modes, the image processing method comprising:

classifying each pixel of the image into one of a plurality of pixel categories based on the image data of each pixel;

dividing the image into a plurality of blocks, the plurality of blocks each including a plurality of pixels adjacent to each other;

classifying each of the plurality of blocks into one of a plurality of block categories based on the pixel category of each of the plurality of pixels belonging to each of the plurality of blocks; and selecting the image output mode by sequentially determining, in accordance with an output mode order allotted to the plurality of output modes, whether or not to select one of the plurality of output modes as the image output mode, based on a ratio of a classified number of blocks, which is a number of blocks classified into each block category, to a reference number of blocks, wherein the selecting the image output mode is performed after the classifying each of the plurality of blocks into one of the plurality of block categories, wherein the plurality of output modes includes at least a first output mode and a second output mode, the first output mode being prior to the second output mode in the output mode order, wherein, in a first determination in the output mode order, determining whether or not to select the first output mode as the image output mode based on a ratio of a first classified number of blocks, which is a number of blocks classified into a first block category, to a first reference number of blocks, which is a total number of the plurality of blocks of the image, and wherein, in a second determination in the output mode order, determining whether or not to select the second output mode as the image output mode based on a ratio of a second classified number of blocks, which is a number of blocks classified into a second block category, to a second reference number of blocks, which is a value obtained by subtracting the first classified number of blocks from the first reference number of blocks.

* * * * *